United States Patent
Wang

(10) Patent No.: US 11,073,678 B2
(45) Date of Patent: Jul. 27, 2021

(54) OPTICAL IMAGING SYSTEM

(71) Applicant: Zhejiang Sunny Optical Co., Ltd, Zhejiang Province (CN)

(72) Inventor: Xinquan Wang, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 0 days.

(21) Appl. No.: 16/076,285

(22) PCT Filed: Nov. 20, 2017

(86) PCT No.: PCT/CN2017/111841
§ 371 (c)(1),
(2) Date: Aug. 7, 2018

(87) PCT Pub. No.: WO2018/233195
PCT Pub. Date: Dec. 27, 2018

(65) Prior Publication Data
US 2021/0088753 A1 Mar. 25, 2021

(30) Foreign Application Priority Data
Jun. 23, 2017 (CN) .......................... 201710485680.4
Jun. 23, 2017 (CN) .......................... 201720738590.7

(51) Int. Cl.
G02B 13/18 (2006.01)
G02B 9/34 (2006.01)
G02B 9/58 (2006.01)
H04N 5/225 (2006.01)

(52) U.S. Cl.
CPC ............. *G02B 9/58* (2013.01); *H04N 5/2253* (2013.01); *G02B 13/18* (2013.01)

(58) Field of Classification Search
CPC ......... G02B 9/58; G02B 13/18; H04N 5/2253
USPC ................. 359/715, 753, 771, 772, 780–783
See application file for complete search history.

(56) References Cited

U.S. PATENT DOCUMENTS

| | | | |
|---|---|---|---|
| 2009/0021846 A1* | 1/2009 | Yamamoto ............... | G02B 9/58 359/781 |
| 2015/0085382 A1* | 3/2015 | Choi ...................... | G02B 13/04 359/715 |
| 2016/0116711 A1* | 4/2016 | Lee ...................... | G02B 13/004 359/350 |

* cited by examiner

*Primary Examiner* — William Choi
(74) *Attorney, Agent, or Firm* — Hauptman Ham, LLP

(57) ABSTRACT

The present disclosure discloses an optical imaging system, the optical imaging system including sequentially, along an optical axis from an object side to an image side, a first lens, a second lens, a third lens and a fourth lens. The first lens has a positive refractive power or a negative refractive power, an object-side surface of the first lens is a concave surface, and an image-side surface of the first lens is a convex surface; both the second lens and the third lens have positive refractive powers; and the fourth lens has a positive refractive power or a negative refractive power, wherein an abbe number V1 of the first lens and an abbe number V4 of the fourth lens satisfy: |V1−V4|≤30; and the abbe number V1 of the first lens and an abbe number V2 of the second lens satisfy: 20≤|V1−V2|≤50.

21 Claims, 14 Drawing Sheets

OPTICAL IMAGING SYSTEM

CROSS-REFERENCE TO RELATED APPLICATIONS

This application is a US National Stage Application under 35 USC § 371 of PCT/CN2017/111841, filed Nov. 20, 2017, which claims priorities and rights from Chinese Patent Application No. 201710485680.4, filed with the State Intellectual Property Office of China (SIPO) on Jun. 23, 2017, and Chinese Patent Application No. 201720738590.7 filed with the SIPO on Jun. 23, 2017, the disclosures of which are hereby incorporated by reference in their entireties.

TECHNICAL FIELD

The present disclosure relates to an optical imaging system, and more specifically, the present disclosure relates to an optical imaging system including four lenses.

BACKGROUND

In recent years, as an often used photosensitive element, such as a CCD (charge-coupled device) or CMOS (complementary metal-oxide semiconductor) is having a higher performance and a smaller size, higher requirements on the high image quality and miniaturization of an optical imaging system matching with the photosensitive element have been brought forward.

With the development of science and technology and the popularity of portable electronic products, optical imaging systems using CCD or CMOS have been widely used in various fields. For example, the optical imaging systems using CCD or CMOS today may also be used for optical flow orientation and navigation in addition to routinely acquiring image information. However, a traditional optical imaging system does not have a strict correction to the monotonicity and the consistency of color distortion. Thus, it cannot achieve optical flow orientation of high accuracy. In addition, in order to acquire optical flow orientation over a large spatial range, corresponding requirements on the wide-angle of the optical imaging system have also been brought forward.

SUMMARY

The present disclosure provides an optical imaging system that may be applied to portable electronic products and may at least solve or partially solve at least one of the above disadvantages in the prior art.

According to an aspect, the present disclosure provides an optical imaging system, the optical imaging system including sequentially, along an optical axis from an object side to an image side, a first lens, a second lens, a third lens and a fourth lens. The first lens has a positive refractive power or a negative refractive power, an object-side surface of the first lens may be a concave surface, and an image-side surface of the first lens may be a convex surface; both the second lens and the third lens may have positive refractive powers; and the fourth lens has a positive refractive power or a negative refractive power. An abbe number V1 of the first lens and an abbe number V4 of the fourth lens may satisfy: $|V1-V4| \leq 20$; and the abbe number V1 of the first lens and an abbe number V2 of the second lens may satisfy: $20 \leq |V1-V2| \leq 50$.

According to another aspect, the present disclosure provides an optical imaging system, the optical imaging system including sequentially, along an optical axis from an object side to an image side, a first lens, a second lens, a third lens and a fourth lens. The first lens has a positive refractive power or a negative refractive power, an object-side surface of the first lens may be a concave surface, and an image-side surface of the first lens may be a convex surface; both the second lens and the third lens may have positive refractive powers; and the fourth lens has a positive refractive power or a negative refractive power, and each of an object-side surface and an image-side surface of the fourth lens may have at least one inflection point.

According to another aspect, the present disclosure provides an optical imaging system, the optical imaging system having a total effective focal length f, and including sequentially, along an optical axis from an object side to an image side, a first lens, a second lens, a third lens and a fourth lens. Both the second lens and the third lens may have positive refractive powers; at least one of the first lens and the fourth lens may have a negative refractive power; and the optical imaging system further includes an electronic photosensitive element disposed on an image plane of the optical imaging system, and half of a diagonal length ImgH of an effective pixel area of the electronic photosensitive element and the total effective focal length f of the optical imaging system may satisfy: $ImgH/f > 1$.

In an implementation, the object-side surface of the first lens may be a concave surface, and the image-side surface of the first lens may be a convex surface.

In an implementation, the object-side surface of the fourth lens may have at least one inflection point, and the image-side surface of the fourth lens may have at least one inflection point.

In an implementation, the fourth lens may have a negative refractive power.

In an implementation, an image-side surface of the third lens may be a convex surface.

In an implementation, a radius of curvature R6 of the image-side surface of the third lens and an effective focal length f3 of the third lens may satisfy: $-0.8 < R6/f3 < -0.3$.

In an implementation, the effective focal length f3 of the third lens and an effective focal length f4 of the fourth lens may satisfy: $0.5 < |f3/f4| < 1.2$.

In an implementation, the abbe number V1 of the first lens and the abbe number V4 of the fourth lens may satisfy: $|V1-V4| \leq 30$.

In an implementation, the abbe number V1 of the first lens and the abbe number V2 of the second lens may satisfy: $20 \leq |V1-V2| \leq 50$.

In an implementation, a center thickness CT2 of the second lens on the optical axis and a center thickness CT3 of the third lens on the optical axis may satisfy: $0.5 < CT2/CT3 < 1$.

In an implementation, a center thickness CT1 of the first lens on the optical axis and a distance TTL from the object-side surface of the first lens to the image plane of the optical imaging system on the optical axis may satisfy: $0.1 < CT1/TTL < 0.2$.

In an implementation, a spacing distance T12 between the first lens and the second lens on the optical axis, a spacing distance T23 between the second lens and the third lens on the optical axis and a spacing distance T34 between the third lens and the fourth lens on the optical axis may satisfy: $(T23+T34)/T12 < 0.85$.

In an implementation, an effective radius DT11 of the object-side surface of the first lens and an effective radius DT42 of the image-side surface of the fourth lens may satisfy: $1 < DT11/DT42 < 1.4$.

In an implementation, the optical imaging system may further include the electronic photosensitive element disposed on the image plane, and the half of the diagonal length ImgH of the effective pixel area of the electronic photosensitive element and the total effective focal length f of the optical imaging system may satisfy: ImgH/f>1.

In an implementation, the optical imaging system may further include the electronic photosensitive element disposed on the image plane, and an effective radius DT12 of the image-side surface of the first lens and the half of the diagonal length ImgH of the effective pixel area of the electronic photosensitive element may satisfy: 0.7<DT12/ImgH<1.

In the present disclosure, for example, four lenses are used. By properly selecting the materials of the lenses, and properly designing the refractive powers, surface types and center thicknesses of the lenses, the axial spacings between the lenses and other aspects, the optical imaging system has an excellent image quality, a large field-of-view angle, and high optical flow orientation accuracy while satisfying the miniaturization characteristic.

BRIEF DESCRIPTION OF THE DRAWINGS

In combination with the accompanying drawings, after reading detailed descriptions of the following non-limiting implementations, other features, objectives and advantages of the present disclosure will become more apparent. In the accompanying drawings.

DETAILED DESCRIPTION OF EMBODIMENTS

Figure 1:
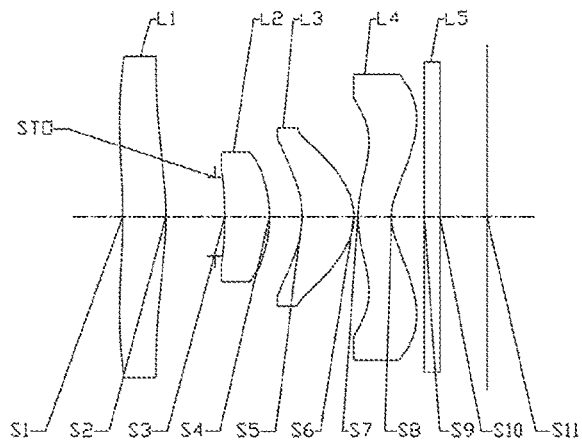
FIG. 1 is a schematic structural diagram illustrating an optical imaging system according to Embodiment 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals refer to the same elements. The expression "and/or" includes any and all combinations of one or more of the associated listed items.

It should be noted that in the specification, the expressions of the first, the second, the third, etc. are only used to distinguish one feature from another, rather than represent any limitations to the features. Thus, the first lens discussed below may also be referred to as the second lens or the third lens without departing from the teachings of the present disclosure.

In the accompanying drawings, the thickness, size and shape of the lens have been slightly exaggerated for the convenience of explanation. Specifically, shapes of spherical surfaces or aspheric surfaces shown in the accompanying drawings are shown by way of example. That is, shapes of spherical surfaces or aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and a position of the convex surface is not defined, it indicates that the surface of the lens is a convex surface at least in the paraxial area; and if a surface of a lens is a concave surface and a position of the concave surface is not defined, it indicates that the surface of the lens is a concave surface at least in the paraxial area. The surface closest to the object in each lens is referred to as the object-side surface, and the surface closest to the image plane in each lens is referred to as the image-side surface.

It should be further understood that the terms "comprising," "including," "having" and variants thereof, when used in this specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing implementations of the present disclosure, relates to "one or more implementations of the present disclosure." In addition, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The present disclosure will be described below in detail with reference to the accompanying drawings and in combination with the embodiments.

The features, principles and other aspects of the present disclosure will be described in detail below.

An optical imaging system according to exemplary implementations of the present disclosure includes, for example, four lenses having refractive powers, i.e., a first lens, a second lens, a third lens and a fourth lens. The four lenses are arranged in sequence from an object side to an image side along an optical axis. The optical imaging system may further include an electronic photosensitive element disposed on an image plane.

The first lens has a positive refractive power or a negative refractive power, an object-side surface of the first lens may be a concave surface, and an image-side surface of the first lens may be a convex surface. The arrangement of the surface types of the first lens not only facilitates the correction to off-axis distortion but also facilitates the obtaining of high relative illumination on the image plane of the optical imaging system.

The second lens may have a positive refractive power. The third lens may have a positive refractive power. The second lens and the third lens have positive refractive powers at the same time, which may avoid a problem of a large spherical aberration caused by the excessive concentration of the refractive powers, and may also avoid problems such as an excessive surface inclination and a molding difficulty.

An image-side surface of the third lens may be a convex surface, and a radius of curvature R6 of the image-side surface of the third lens and an effective focal length f3 of the third lens may satisfy: $-0.8<R6/f3<-0.3$, and more specifically, R6 and f3 may further satisfy: $-0.72<R6/f3<-0.33$. Arranging the image-side surface of the third lens to be a convex surface can effectively reduce the field curvature of each field of view. Satisfying the conditional expression $-0.8<R6/f3<-0.3$ may effectively control the surface shape of the third lens and the distribution of the refractive power, which makes the third lens have a good processing and molding technology.

The fourth lens has a positive refractive power or a negative refractive power. Each of an object-side surface and an image-side surface of the fourth lens may have at least one inflection point. This arrangement of the surface types may effectively adjust the incident angle of light incident on the fourth lens, and improve an off-axis spherical aberration, a coma aberration and astigmatism; and at the same time, it may also correct a lateral chromatic aberration and the consistency of the color distortion. In some implementations, the fourth lens may have a negative refractive power. When the fourth lens has a negative refractive power, it is advantageous to increase the chief ray angle and reduce the total length of the imaging system, thereby realizing the miniaturization of the optical imaging system. Meanwhile, the fourth lens having the negative refractive power also helps to balance chromatic aberrations generated by the second lens and the third lens.

The effective focal length f3 of the third lens and an effective focal length f4 of the fourth lens may satisfy: $0.5|f3/f4|<1.2$, and more specifically, f3 and f4 may further satisfy: $0.61 \leq |f3/f4| \leq 1.08$, in order to avoid the excessive concentration of the refractive powers and reduce the tolerance sensitivity of the system.

An abbe number V1 of the first lens and an abbe number V2 of the second lens may satisfy: $20 \leq |V1-V2| \leq 50$, and more specifically, V1 and V2 may further satisfy: $32.58 \leq |V1-V2| \leq 35.74$. The abbe number V1 of the first lens and an abbe number V4 of the fourth lens may satisfy: $|V1-V4| \leq 30$, and more specifically, V1 and V4 may further satisfy: $|V1-V4| \leq 20$, for example, $0 \leq |V1-V4| \leq 3.16$. Satisfying the conditional expressions $20 \leq |V1-V2| \leq 50$ and $|V1-V4| \leq 30$ may effectively reduce chromatic aberrations of the optical imaging system.

In the application, the center thickness of each lens may be properly arranged so that the optical imaging system has an excellent optical performance.

A center thickness CT2 of the second lens on the optical axis and a center thickness CT3 of the third lens on the optical axis may satisfy: $0.5<CT2/CT3<1$, and more specifically, CT2 and CT3 may further satisfy: $0.70 \leq CT2/CT3 \leq 0.95$. By properly arranging the center thicknesses of the second lens and the third lens, it is advantageous to disperse the refractive powers of the system mainly to the second lens and the third lens, which avoids problems such as a large aberration generated due to the excessive concentration of the refractive powers and a molding difficulty caused by the excessive bending of the surface.

A center thickness CT1 of the first lens on the optical axis and a total track length TTL of the optical imaging system (i.e., a distance from an object-side surface of a lens having a refractive power closest to the object side to the image plane of the optical imaging system on the optical axis) may satisfy: $0.1<CT1/TTL<0.2$, and more specifically, CT1 and TTL may further satisfy: $0.10 \leq CT1/TTL \leq 0.12$. Satisfying the conditional expression $0.1<CT1/TTL<0.2$ is advantageous to ensure a good balance between the total track length of the system and the center thickness of the first lens while shortening the total length of the optical imaging system.

A spacing distance T23 between the second lens and the third lens on the optical axis, a spacing distance T34 between the third lens and the fourth lens on the optical axis and a spacing distance T12 between the first lens and the second lens on the optical axis may satisfy: $(T23+T34)/T12<0.85$, and more specifically, T23, T34 and T12 may further satisfy: $0.24 \leq (T23+T34)/T12 \leq 0.73$. By properly configuring the spacing distances between the lenses, the distribution of the first lens, the second lens, the third lens, and the fourth lens having refractive powers may be more appropriate, so as to prevent the light from excessively bending in the process of passing through any of the lenses having refractive powers, thus effectively reducing the sensitivity of the system.

An effective radius DT11 of the object-side surface of the first lens and an effective radius DT42 of the image-side surface of the fourth lens may satisfy: 1<DT11/DT42<1.4, and more specifically, DT11 and DT42 may further satisfy: 1.07≤DT11/DT42≤1.17. In the exemplary implementations, the optical imaging system includes four lenses having refractive powers. When light from the object side passes through the four lenses having the refractive powers, it first needs to enter from the object-side surface of the first lens, and finally exit from the image-side surface of the fourth lens. By properly configuring DT11 and DT42, the optical paths of the incident light and the emergent light may be effectively adjusted to correct off-axis spherical aberrations, distortion, and a field curvature of the system. In addition, the proper configuration will also have an effect of a field diaphragm, and may avoid the generation of astigmatism.

An effective radius DT12 of the image-side surface of the first lens and half of a diagonal length ImgH of an effective pixel area of the electronic photosensitive element on the image plane of the optical imaging system may satisfy: 0.7<DT12/ImgH<1, and more specifically, DT12 and ImgH may further satisfy: 0.79≤DT12/ImgH≤0.88. Satisfying the conditional expression 0.7<DT12/ImgH<1 is advantageous to obtain a balance between the light incident angle and the surface inclination of the first lens, so as to effectively adjust the incident ray path of each field-of-view, which makes the wide-angle system have high relative illumination.

The half of the diagonal length ImgH of the effective pixel area of the electronic photosensitive element on the image plane of the optical imaging system and a total effective focal length f of the optical imaging system may satisfy: ImgH/f>1, and more specifically, ImgH and f may further satisfy: 1.07≤ImgH/f≤1.16, in order to realize the imaging to a large object-side space by the electronic photosensitive element, thus realizing optical flow orientation over a larger spatial range.

The optical imaging system according to the above implementations of the present disclosure may use, for example, four lenses. By properly selecting the materials of the lenses, and properly designing the refractive powers, surface types and center thicknesses of the lenses, the axial spacings between the lenses and other aspects, the optical imaging system has an excellent image quality and a large field-of-view angle while the miniaturization characteristic is realized. In addition, since the above optical imaging system may perform a strict correction to the monotonicity and the consistency of the color distortion, the optical imaging system may have high optical flow orientation accuracy.

In the implementations of the present disclosure, at least one of the mirror surfaces of the lenses is an aspheric mirror surface. The characteristic of the aspheric lens is: from the center of the lens to the periphery, the curvature is continuously changing. Unlike the spherical lens with a constant curvature from the center of the lens to the periphery, the aspheric lens has a better radius-of-curvature characteristic, and has advantages of improving a distortion aberration and improving an astigmatic aberration. Using the aspheric lens, aberrations occurring at the time of imaging can be eliminated as much as possible, thereby improving the image quality of the optical imaging system.

However, it should be understood by those skilled in the art that the various results and advantages described in the present specification may be obtained by changing the number of the lenses constituting the optical imaging system without departing from the technical solution sought to be protected by the present disclosure. For example, although four lenses are described as an example in the implementations, the optical imaging system is not limited to include four lenses. If desired, the optical imaging system may also include other numbers of lenses.

Specific embodiments of the optical imaging system that may be applied to the above implementations are further described below with reference to the accompanying drawings.

Embodiment 1

An optical imaging system according to Embodiment 1 of the present disclosure is described below with reference to FIGS. 1 to 2E. FIG. 1 is a schematic structural diagram illustrating the optical imaging system according to Embodiment 1 of the present disclosure.

As shown in FIG. 1, the optical imaging system sequentially includes, along an optical axis from an object side to an image side, a first lens L1, a second lens L2, a third lens L3, a fourth lens L4 and an image plane S11. The optical imaging system may further include an electronic photosensitive element disposed on the image plane S11.

The first lens L1 has a positive refractive power, an object-side surface S1 of the first lens L1 is a concave surface, an image-side surface S2 of the first lens L1 is a convex surface, and both the object-side surface S1 and the image-side surface S2 of the first lens L1 are aspheric surfaces.

The second lens L2 has a positive refractive power, an object-side surface S3 of the second lens L2 is a concave surface, an image-side surface S4 of the second lens L2 is a convex surface, and both the object-side surface S3 and the image-side surface S4 of the second lens L2 are aspheric surfaces.

The third lens L3 has a positive refractive power, an object-side surface S5 of the third lens L3 is a concave surface, an image-side surface S6 of the third lens L3 is a convex surface, and both the object-side surface S5 and the image-side surface S6 of the third lens L3 are aspheric surfaces.

The fourth lens L4 has a negative refractive power, an object-side surface S7 of the fourth lens L4 is a convex surface and has at least one inflection point, an image-side surface S8 of the fourth lens L4 is a concave surface and has at least one inflection point, and both the object-side surface S7 and the image-side surface S8 of the fourth lens L4 are aspheric surfaces.

Alternatively, the optical imaging system may further include an optical filter L5 having an object-side surface S9 and an image-side surface S10. Light from an object sequentially passes through the surfaces S1 to S10 and is finally imaged on the image plane S11.

In the optical imaging system of the present embodiment, a diaphragm STO may also be provided, for example, between the first lens L1 and the second lens L2 for limiting light beams, to improve the image quality of the optical imaging system. Alternatively, the optical imaging system of the present embodiment may further include a vignetting diaphragm ST1 provided between the second lens L2 and the third lens L3.

Table 1 shows the surface type, the radius of curvature, the thickness, the material and the conic coefficient of each lens of the optical imaging system in Embodiment 1, wherein the units of the radius of curvature and the thickness are millimeters (mm).

TABLE 1

| Surface Number | Surface Type | Radius of Curvature | Thickness | Refractive Index | Abbe Number | Conic Coefficient |
|---|---|---|---|---|---|---|
| OBJ | spherical | Infinite | infinite | | | |
| S1 | aspheric | −6.8757 | 0.5711 | 1.64 | 23.5 | −10.4573 |
| S2 | aspheric | −3.8137 | 0.6466 | | | −37.5728 |
| STO | spherical | Infinite | 0.1262 | | | |
| S3 | aspheric | −7.4977 | 0.5880 | 1.55 | 56.1 | 20.3375 |
| S4 | aspheric | −1.6906 | 0.0000 | | | 0.0000 |
| ST1 | spherical | −5.0000 | 0.4401 | | | |
| S5 | aspheric | −1.2167 | 0.6825 | 1.55 | 56.1 | 0.0000 |
| S6 | aspheric | −0.6779 | 0.0500 | | | −2.5024 |
| S7 | aspheric | 1.5297 | 0.4409 | 1.67 | 20.4 | −0.8185 |
| S8 | aspheric | 0.7144 | 0.4302 | | | −4.2145 |
| S9 | spherical | Infinite | 0.2100 | 1.52 | 64.2 | |
| S10 | spherical | infinite | 0.6145 | | | |
| S11 | spherical | infinite | | | | |

As may be seen from Table 1, the abbe number V1 of the first lens L1 and the abbe number V2 of the second lens L2 satisfy: |V1−V2|=32.58; the abbe number V1 of the first lens L1 and the abbe number V4 of the fourth lens L4 satisfy: |V1−V4|=3.16; the center thickness CT2 of the second lens L2 on the optical axis and the center thickness CT3 of the third lens L3 on the optical axis satisfy: CT2/CT3=0.86; the center thickness CT1 of the first lens L1 on the optical axis and the distance TTL from the object-side surface S1 of the first lens L1 to the image plane S11 on the optical axis satisfy: CT1/TTL=0.12; the spacing distance T23 between the second lens L2 and the third lens L3 on the optical axis, the spacing distance T34 between the third lens L3 and the fourth lens L4 on the optical axis and the spacing distance T12 between the first lens L1 and the second lens L2 on the optical axis satisfy: (T23+T34)/T12=0.63.

In the present embodiment, the surface type x of each aspheric surface is defined by the following formula:

$$x = \frac{ch^2}{1+\sqrt{1-(k+1)c^2h^2}} + \sum A_i h^i. \qquad (1)$$

Here, x is the distance sagittal height to the vertex of the aspheric surface when the aspheric surface is at a position of a height h along the optical axis; c is the paraxial curvature of the aspheric surface, and c=1/R (i.e., the paraxial curvature c is the reciprocal of the radius of curvature R in Table 1 above); k is the conic coefficient (given in Table 1 above); and $A_i$ is the correction coefficient of the $i^{th}$ order of the aspheric surface. Table 2 below shows the higher-order coefficients $A_4$, $A_6$, $A_8$, $A_{10}$, $A_{12}$, $A_{14}$ and $A_{16}$ applicable to the aspheric mirror surface S1-S8 in Embodiment 1.

Table 3 below shows the total effective focal length f of the optical imaging system, the effective focal lengths f1 to f4 of the lenses, the total track length TTL of the optical imaging system (i.e., the distance from the object-side surface S1 of the first lens L1 to the image plane S11 on the optical axis), the half of the diagonal length ImgH of the effective pixel area of the electronic photosensitive element on the image plane S11 and the half of the maximal field-of-view HFOV of the optical imaging system in Embodiment 1.

TABLE 3

| | Parameter | | | | |
|---|---|---|---|---|---|
| | f(mm) | f1(mm) | f2(mm) | f3(mm) | f4(mm) |
| Numerical value | 2.12 | 12.38 | 3.86 | 1.94 | −2.57 |

| | Parameter | | |
|---|---|---|---|
| | TTL(mm) | ImgH(mm) | HFOV(°) |
| Numerical value | 4.80 | 2.26 | 47.39 |

As may be obtained from Table 3, the half of the diagonal length ImgH of the effective pixel area of the electronic photosensitive element on the image plane S11 and the total effective focal length f of the optical imaging system satisfy: ImgH/f=1.07; and the effective focal length f3 of the third lens L3 and the effective focal length f4 of the fourth lens L4 satisfy: |f3/f4|=0.75. According to Table 1 and Table 3, the radius of curvature R6 of the image-side surface S6 of the third lens L3 and the effective focal length f3 of the third lens L3 satisfy: R6/f3=−0.35.

TABLE 2

| Surface Number | A4 | A6 | A8 | A10 | A12 | A14 | A16 |
|---|---|---|---|---|---|---|---|
| S1 | 4.3847E−02 | −1.6774E−02 | 4.1137E−03 | −5.2940E−04 | 2.7248E−05 | 0.0000E+00 | 0.0000E+00 |
| S2 | 2.3416E−02 | −1.4071E−02 | 5.3811E−03 | −9.9127E−04 | 5.9700E−05 | 1.9790E−06 | 0.0000E+00 |
| S3 | −1.2979E−01 | 3.3386E−01 | −1.9507E+00 | 5.8425E+00 | −1.2817E+01 | 1.2341E+01 | 0.0000E+00 |
| S4 | −3.5708E−01 | 1.6627E−01 | −6.6383E−01 | 1.6732E+00 | −2.5124E+00 | 1.4545E+00 | −2.3933E−01 |
| S5 | 1.4549E−01 | 3.3211E−02 | −2.6295E−01 | 7.5673E−01 | −6.8010E−01 | 2.1308E−01 | 0.0000E+00 |
| S6 | −1.7100E−01 | 5.5743E−03 | 2.4440E−02 | −5.0305E−02 | 8.9878E−02 | −2.9982E−02 | 0.0000E+00 |
| S7 | −2.1877E−01 | −1.1094E−02 | 8.0821E−02 | −5.8938E−02 | 1.8305E−02 | −2.0464E−03 | 0.0000E+00 |
| S8 | −1.1262E−01 | 4.0094E−02 | −1.2122E−02 | 1.7653E−03 | −1.0432E−04 | 2.0776E−06 | 0.0000E+00 |

In the present embodiment, the effective radius DT11 of the object-side surface S1 of the first lens L1 and the effective radius DT42 of the image-side surface S8 of the fourth lens L4 satisfy: DT11/DT42=1.12; and the effective radius DT12 of the image-side surface S2 of the first lens L1 and the half of the diagonal length ImgH of the effective pixel area of the electronic photosensitive element on the image plane S11 satisfy: DT12/ImgH=0.83.

Figure 2A:
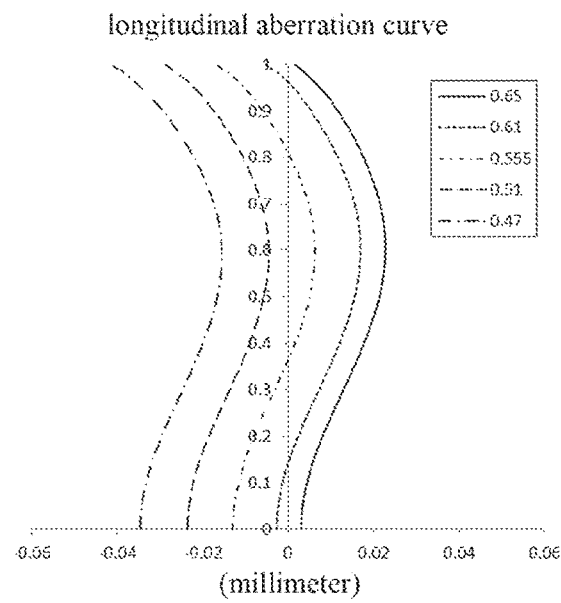
FIGS. 2A-2E respectively illustrate a longitudinal aberration curve, an astigmatic curve, a distortion curve, a lateral color curve and a relative illumination curve of the optical imaging system according to Embodiment 1.
Figure 2B:
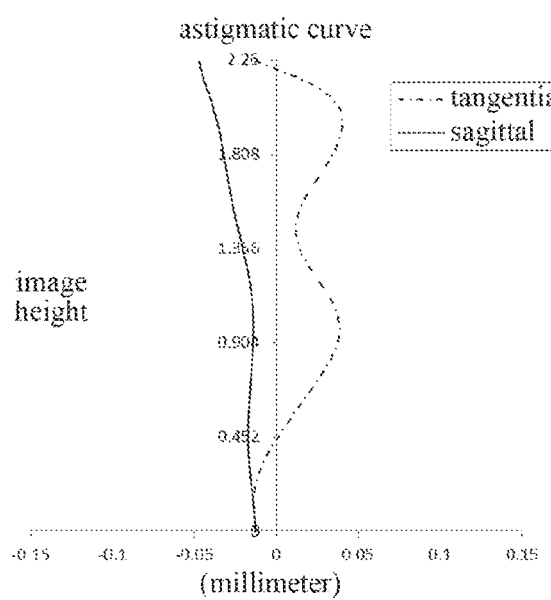
Figure 2C:
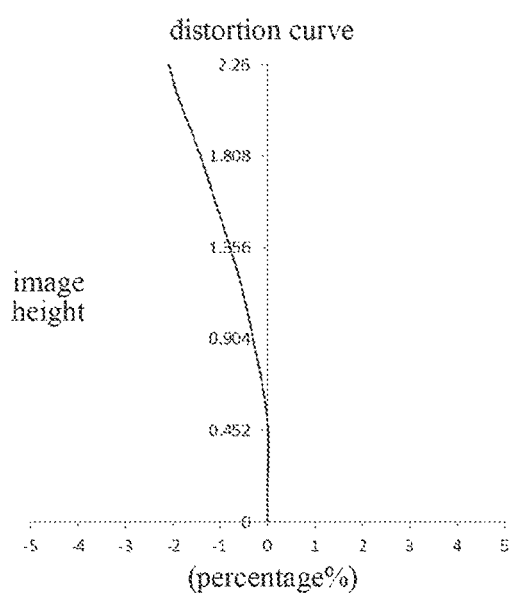
Figure 2D:
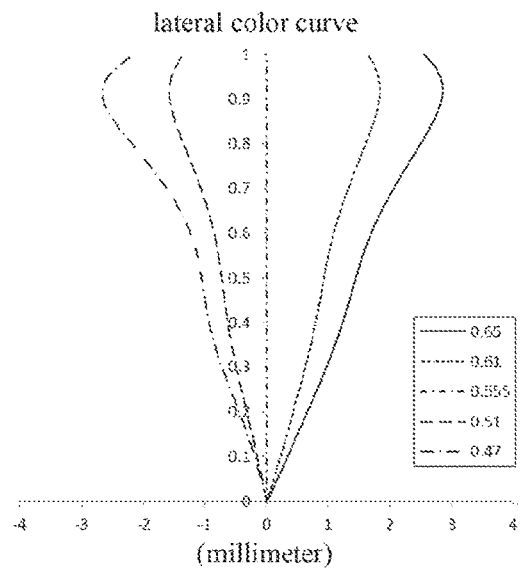
Figure 2E:
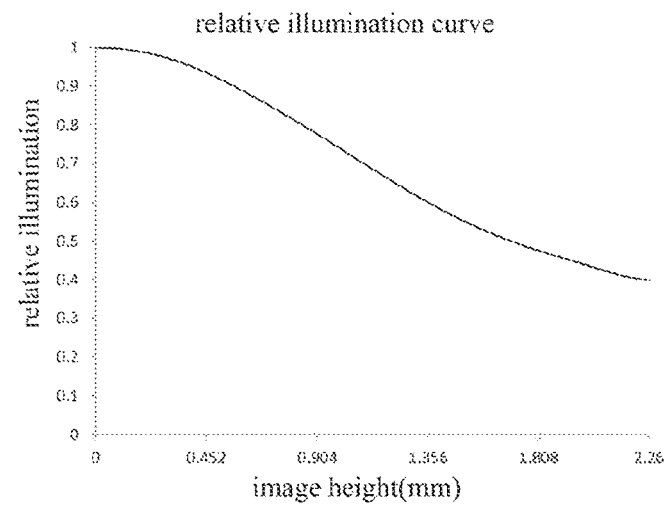

FIG. 2A shows a longitudinal aberration curve of the optical imaging system according to Embodiment 1, representing deviations of focal points of light of different wavelengths converged after passing through an optical system. FIG. 2B shows an astigmatic curve of the optical imaging system according to Embodiment 1, representing a curvature of a tangential image plane and a curvature of a sagittal image plane. FIG. 2C shows a distortion curve of the optical imaging system according to Embodiment 1, representing amounts of distortion at different viewing angles. FIG. 2D shows a lateral color curve of the optical imaging system according to Embodiment 1, representing deviations of different image heights on an image plane after light passes through the optical imaging system. FIG. 2E shows a relative illumination curve of the optical imaging system according to Embodiment 1, representing relative illumination corresponding to different image heights on the image plane. It can be seen from FIGS. 2A to 2E that the optical imaging system according to Embodiment 1 can achieve a good image quality.

Embodiment 2

Figure 3:
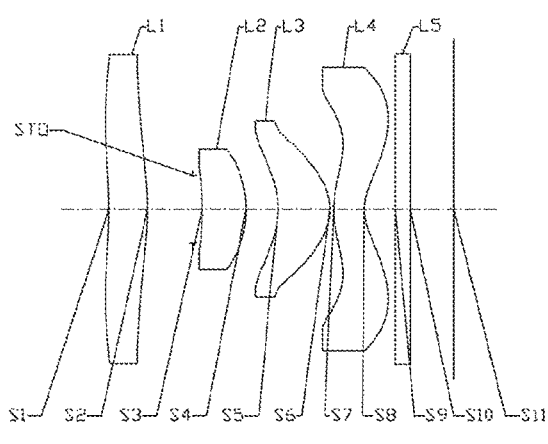
FIG. 3 is a schematic structural diagram illustrating an optical imaging system according to Embodiment 2 of the present disclosure.

An optical imaging system according to Embodiment 2 of the present disclosure is described below with reference to FIGS. 3 to 4E. In the present embodiment and the following embodiments, for the purpose of brevity, the description of parts similar to those in Embodiment 1 will be omitted. FIG. 3 is a schematic structural diagram illustrating the optical imaging system according to Embodiment 2 of the present disclosure.

As shown in FIG. 3, the optical imaging system sequentially includes, along an optical axis from an object side to an image side, a first lens L1, a second lens L2, a third lens L3, a fourth lens L4 and an image plane S11. The optical imaging system may further include an electronic photosensitive element disposed on the image plane S11.

The first lens L1 has a positive refractive power, an object-side surface S1 of the first lens L1 is a concave surface, an image-side surface S2 of the first lens L1 is a convex surface, and both the object-side surface S1 and the image-side surface S2 of the first lens L1 are aspheric surfaces.

The second lens L2 has a positive refractive power, an object-side surface S3 of the second lens L2 is a concave surface, an image-side surface S4 of the second lens L2 is a convex surface, and both the object-side surface S3 and the image-side surface S4 of the second lens L2 are aspheric surfaces.

The third lens L3 has a positive refractive power, an object-side surface S5 of the third lens L3 is a concave surface, an image-side surface S6 of the third lens L3 is a convex surface, and both the object-side surface S5 and the image-side surface S6 of the third lens L3 are aspheric surfaces.

The fourth lens L4 has a negative refractive power, an object-side surface S7 of the fourth lens L4 is a convex surface and has at least one inflection point, an image-side surface S8 of the fourth lens L4 is a concave surface and has at least one inflection point, and both the object-side surface S7 and the image-side surface S8 of the fourth lens L4 are aspheric surfaces.

Alternatively, the optical imaging system may further include an optical filter L5 having an object-side surface S9 and an image-side surface S10. Light from an object passes through the surfaces S1 to S10 sequentially and is finally imaged on the image plane S11.

In the optical imaging system of the present embodiment, a diaphragm STO may also be provided, for example, between the first lens L1 and the second lens L2 for limiting light beams, to improve the image quality of the optical imaging system.

Table 4 shows the surface type, the radius of curvature, the thickness, the material and the conic coefficient of each lens of the optical imaging system in Embodiment 2, wherein the units of the radius of curvature and the thickness are millimeters (mm). Table shows the higher-order coefficients applicable to each aspheric mirror surface in Embodiment 2, wherein the respective aspheric surface types may be defined by the formula (1) given in the above Embodiment 1. Table 6 shows the total effective focal length f of the optical imaging system, the effective focal lengths f1 to f4 of the lenses, the total track length TTL of the optical imaging system, the half of the diagonal length ImgH of the effective pixel area of the electronic photosensitive element on the image plane S11 and the half of the maximal field-of-view HFOV of the optical imaging system in Embodiment 2.

TABLE 4

| Surface Number | Surface Type | Radius of Curvature | Thickness | Material Refractive Index | Abbe Number | Conic Coefficient |
|---|---|---|---|---|---|---|
| OBJ | spherical | infinite | infinite | | | |
| S1 | aspheric | −6.1168 | 0.5392 | 1.64 | 23.5 | −23.4691 |
| S2 | aspheric | −3.6808 | 0.6300 | | | −35.6117 |
| STO | spherical | infinite | 0.1278 | | | |
| S3 | aspheric | −5.9166 | 0.6098 | 1.55 | 56.1 | 18.9378 |
| S4 | aspheric | −1.5198 | 0.4547 | | | 0.0000 |
| S5 | aspheric | −1.2117 | 0.7230 | 1.55 | 56.1 | 0.0000 |
| S6 | aspheric | −0.6638 | 0.0500 | | | −2.4400 |
| S7 | aspheric | 1.3636 | 0.4249 | 1.67 | 20.4 | −1.4876 |
| S8 | aspheric | 0.6216 | 0.4301 | | | −4.0920 |
| S9 | spherical | infinite | 0.2100 | 1.52 | 64.2 | |
| S10 | spherical | infinite | 0.6026 | | | |
| S11 | spherical | infinite | | | | |

TABLE 5

| Surface Number | A4 | A6 | A8 | A10 | A12 | A14 | A16 |
|---|---|---|---|---|---|---|---|
| S1 | 4.5057E−02 | −1.9197E−02 | 5.2167E−03 | −7.6811E−04 | 4.5151E−05 | 0.0000E+00 | 0.0000E+00 |
| S2 | 2.9072E−02 | −1.8661E−02 | 7.6918E−03 | −1.7195E−03 | 1.6378E−04 | −2.7175E−06 | 0.0000E+00 |
| S3 | −1.8549E−01 | 1.2514E+00 | −1.0383E+01 | 4.4081E+01 | −9.9693E+01 | 9.4465E+01 | 0.0000E+00 |
| S4 | 1.2772E−02 | −1.6261E−01 | 8.5720E−01 | −2.6898E+00 | 4.9218E+00 | −5.3981E+00 | 2.4876E+00 |
| S5 | 2.6602E−01 | −3.2667E−01 | 3.1388E−01 | 2.3039E−01 | −4.7667E−01 | 2.7607E−01 | −5.5757E−02 |
| S6 | −5.7041E−02 | −4.5869E−01 | 9.9413E−01 | −1.1344E+00 | 6.9413E−01 | −1.6139E−01 | 0.0000E+00 |
| S7 | −3.1758E−01 | 1.0736E−01 | 6.4330E−03 | −3.1927E−02 | 1.3750E−02 | −1.8118E−03 | 0.0000E+00 |
| S8 | −1.3644E−01 | 5.3006E−02 | −1.5589E−02 | 2.2763E−03 | −1.3653E−04 | 2.7792E−06 | 0.0000E+00 |

TABLE 6

| Parameter | | | | |
|---|---|---|---|---|
| f(mm) | f1(mm) | f2(mm) | f3(mm) | f4(mm) |
| Numerical Value 2.10 | 13.19 | 3.57 | 1.83 | −2.22 |

| Parameter | | |
|---|---|---|
| TTL(mm) | ImgH(mm) | HFOV(°) |
| Numerical Value 4.80 | 2.40 | 49.32 |

Figure 4A:
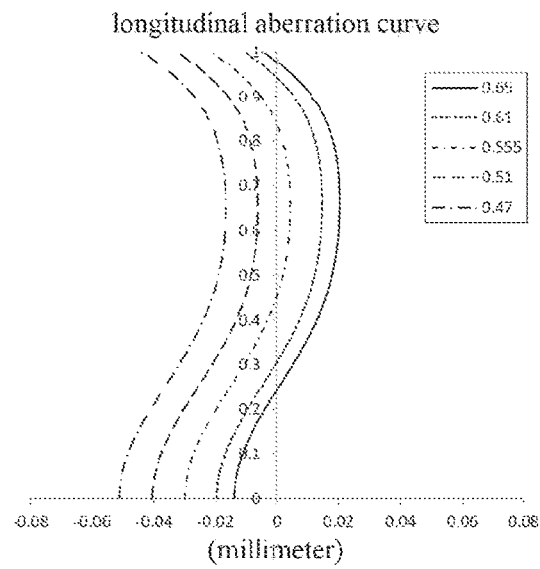
FIGS. 4A-4E respectively illustrate a longitudinal aberration curve, an astigmatic curve, a distortion curve, a lateral color curve and a relative illumination curve of the optical imaging system according to Embodiment 2.
Figure 4B:
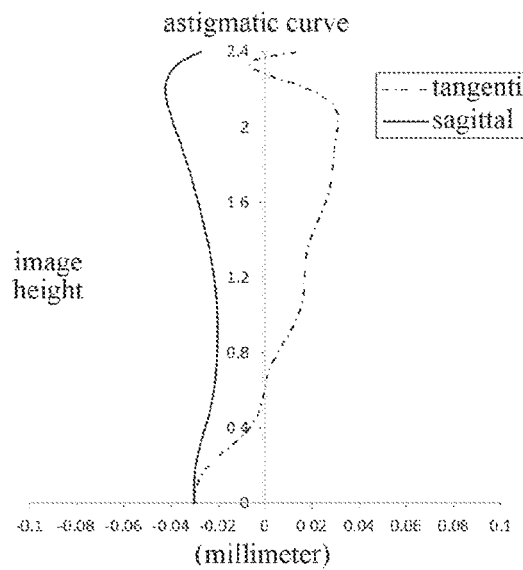
Figure 4C:
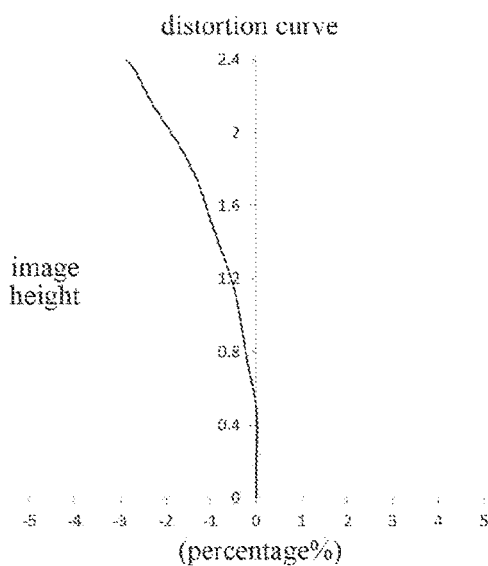
Figure 4D:
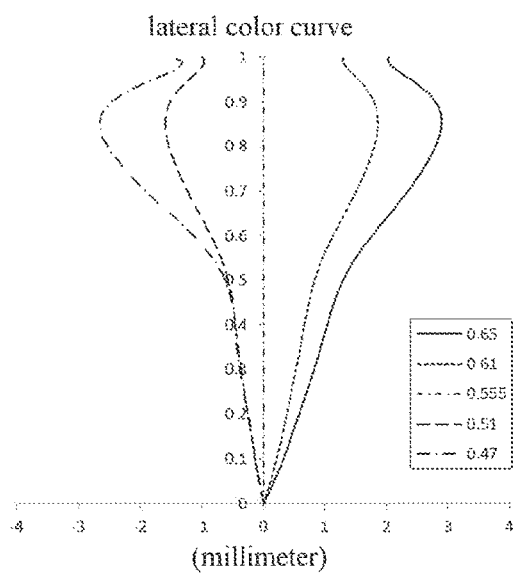
Figure 4E:
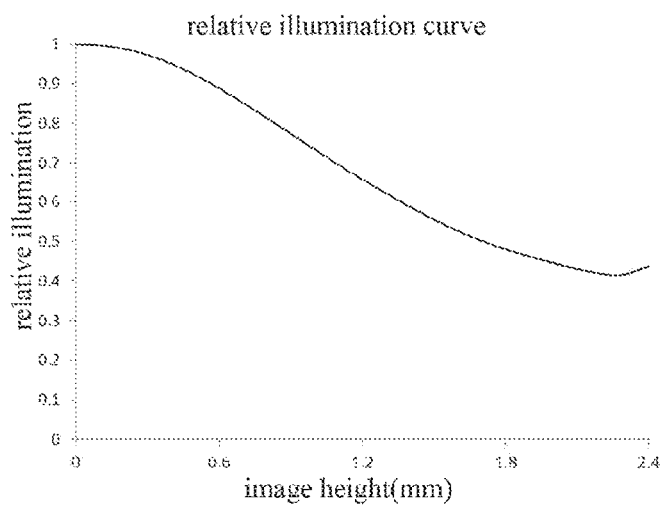

FIG. 4A shows a longitudinal aberration curve of the optical imaging system according to Embodiment 2, representing deviations of focal points of light of different wavelengths converged after passing through an optical system. FIG. 4B shows an astigmatic curve of the optical imaging system according to Embodiment 2, representing a curvature of a tangential image plane and a curvature of a sagittal image plane. FIG. 4C shows a distortion curve of the optical imaging system according to Embodiment 2, representing amounts of distortion at different viewing angles. FIG. 4D shows a lateral color curve of the optical imaging system according to Embodiment 2, representing deviations of different image heights on an image plane after light passes through the optical imaging system. FIG. 4E shows a relative illumination curve of the optical imaging system according to Embodiment 2, representing relative illumination corresponding to different image heights on the image plane. It can be seen from FIGS. 4A to 4E that the optical imaging system according to Embodiment 2 can achieve a good image quality.

Embodiment 3

Figure 5:
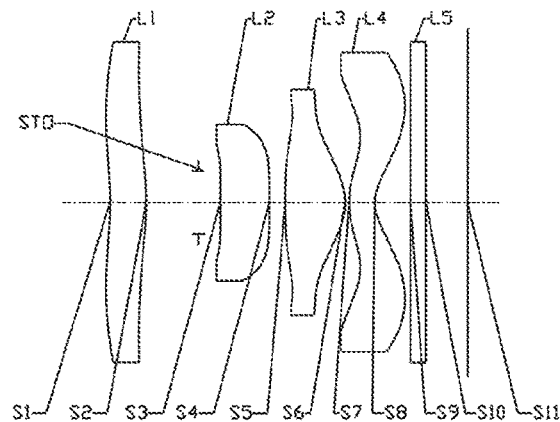
FIG. 5 is a schematic structural diagram illustrating an optical imaging system according to Embodiment 3 of the present disclosure.

An optical imaging system according to Embodiment 3 of the present disclosure is described below with reference to FIGS. 5 to 6E. FIG. 5 is a schematic structural diagram illustrating the optical imaging system according to Embodiment 3 of the present disclosure.

As shown in FIG. 5, the optical imaging system sequentially includes, along an optical axis from an object side to an image side, a first lens L1, a second lens L2, a third lens L3, a fourth lens L4 and an image plane S11. The optical imaging system may further include an electronic photosensitive element disposed on the image plane S11.

The first lens L1 has a positive refractive power, an object-side surface S1 of the first lens L1 is a concave surface, an image-side surface S2 of the first lens L1 is a convex surface, and both the object-side surface S1 and the image-side surface S2 of the first lens L1 are aspheric surfaces.

The second lens L2 has a positive refractive power, an object-side surface S3 of the second lens L2 is a convex surface, an image-side surface S4 of the second lens L2 is a convex surface, and both the object-side surface S3 and the image-side surface S4 of the second lens L2 are aspheric surfaces.

The third lens L3 has a positive refractive power, an object-side surface S5 of the third lens L3 is a convex surface, an image-side surface S6 of the third lens L3 is a convex surface, and both the object-side surface S5 and the image-side surface S6 of the third lens L3 are aspheric surfaces.

The fourth lens L4 has a negative refractive power, an object-side surface S7 of the fourth lens L4 is a convex surface and has at least one inflection point, an image-side surface S8 of the fourth lens L4 is a concave surface and has at least one inflection point, and both the object-side surface S7 and the image-side surface S8 of the fourth lens L4 are aspheric surfaces.

Alternatively, the optical imaging system may further include an optical filter L5 having an object-side surface S9 and an image-side surface S10. Light from an object sequentially passes through the surfaces S1 to S10 and is finally imaged on the image plane S11.

In the optical imaging system of the present embodiment, a diaphragm STO may also be provided, for example, between the first lens L1 and the second lens L2 for limiting light beams, to improve the image quality of the optical imaging system.

Table 7 shows the surface type, the radius of curvature, the thickness, the material and the conic coefficient of each lens of the optical imaging system in Embodiment 3, wherein the units of the radius of curvature and the thickness are millimeters (mm). Table 8 shows the higher-order coefficients applicable to each aspheric mirror surface in Embodiment 3, wherein the respective aspheric surface types may be defined by the formula (1) given in the above Embodiment 1. Table 9 shows the total effective focal length f of the optical imaging system, the effective focal lengths f1 to f4 of the lenses, the total track length TTL of the optical imaging system, the half of the diagonal length ImgH of the effective pixel area of the electronic photosensitive element on the image plane S11 and the half of the maximal field-of-view HFOV of the optical imaging system in Embodiment 3.

TABLE 7

| Surface Number | Surface Type | Radius of Curvature | Thickness | Material Refractive Index | Abbe Number | Conic Coefficient |
|---|---|---|---|---|---|---|
| OBJ | spherical | infinite | infinite | | | |
| S1 | aspheric | −5.1038 | 0.4990 | 1.67 | 20.4 | −6.3690 |
| S2 | aspheric | −3.6577 | 0.7129 | | | −20.0041 |
| STO | spherical | infinite | 0.2963 | | | |
| S3 | aspheric | 20.2277 | 0.6709 | 1.55 | 56.1 | 20.3667 |
| S4 | aspheric | −65.9211 | 0.2207 | | | 7.9284 |
| S5 | aspheric | 20.4767 | 0.8272 | 1.55 | 56.1 | 0.0000 |
| S6 | aspheric | −0.7493 | 0.0500 | | | −4.1770 |
| S7 | aspheric | 1.1449 | 0.3527 | 1.67 | 20.4 | −1.3472 |
| S8 | aspheric | 0.5032 | 0.4899 | | | −3.1844 |
| S9 | spherical | infinite | 0.2100 | 1.52 | 64.2 | |
| S10 | spherical | infinite | 0.5703 | | | |
| S11 | spherical | infinite | | | | |

TABLE 8

| Surface Number | A4 | A6 | A8 | A10 | A12 | A14 |
|---|---|---|---|---|---|---|
| S1 | 6.3895E−02 | −2.4233E−02 | 5.7814E−03 | −7.6857E−04 | 4.2869E−05 | 0.0000E+00 |
| S2 | 6.1902E−02 | −4.0619E−02 | 1.6464E−02 | −3.9409E−03 | 5.0165E−04 | −2.5697E−05 |
| S3 | −1.7268E−01 | 1.1029E−01 | −2.1890E−01 | −4.0444E−01 | 1.2297E+00 | −8.3240E−01 |
| S4 | −1.0403E−01 | −8.7921E−02 | −1.7452E−01 | 3.3753E−01 | −3.2644E−01 | 1.1469E−01 |
| S5 | 2.1553E−01 | −3.2842E−01 | 3.1590E−01 | −1.9548E−01 | 6.1821E−02 | −7.4180E−03 |
| S6 | −1.4164E−02 | −1.2760E−02 | 9.3298E−02 | −5.2513E−02 | 7.7806E−03 | 2.1718E−04 |
| S7 | −3.8102E−01 | 1.7702E−01 | −9.9093E−02 | 4.9892E−02 | −1.2889E−02 | 1.2491E−03 |
| S8 | −1.6447E−01 | 6.4192E−02 | −1.6176E−02 | 1.8627E−03 | 1.8658E−05 | −1.5590E−05 |

TABLE 9

| | Parameter | | | | |
|---|---|---|---|---|---|
| | f(mm) | f1(mm) | f2(mm) | f3(mm) | f4(mm) |
| Numerical value | 2.10 | 17.02 | 28.43 | 1.34 | −1.73 |

| | Parameter | | |
|---|---|---|---|
| | TTL(mm) | ImgH(mm) | HFOV(°) |
| Numerical value | 4.90 | 2.40 | 49.74 |

Figure 6A:
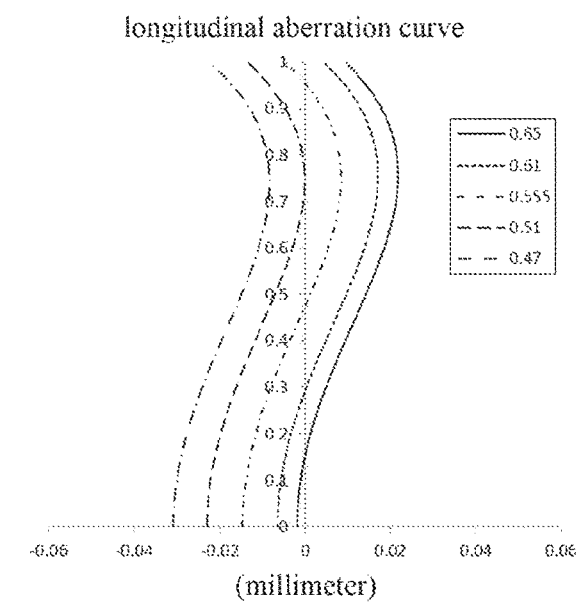
FIGS. 6A-6E respectively illustrate a longitudinal aberration curve, an astigmatic curve, a distortion curve, a lateral color curve and a relative illumination curve of the optical imaging system according to Embodiment 3.
Figure 6B:
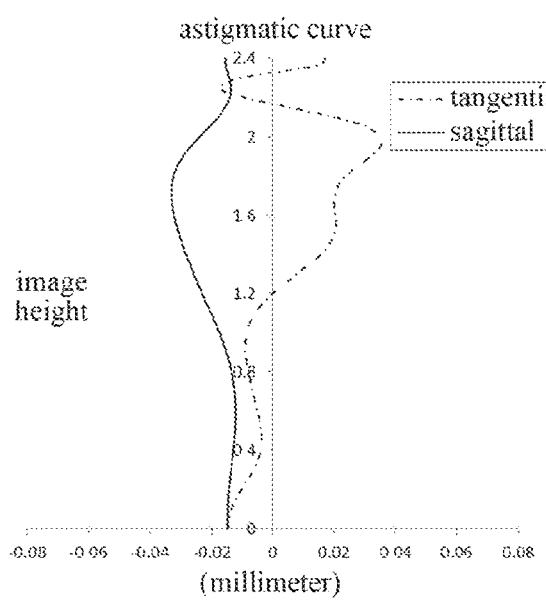
Figure 6C:
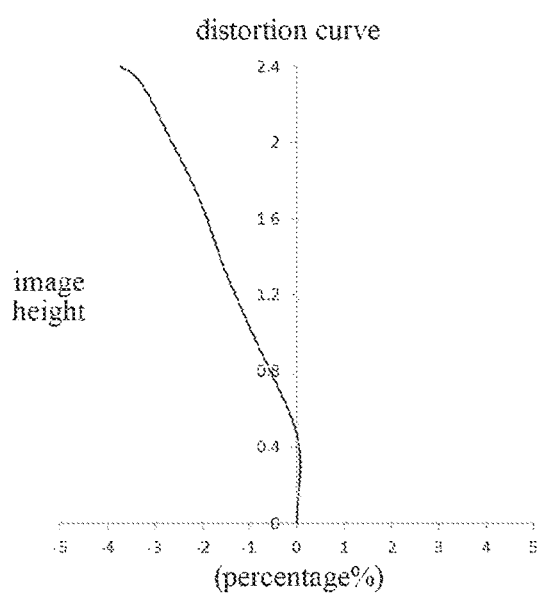
Figure 6D:
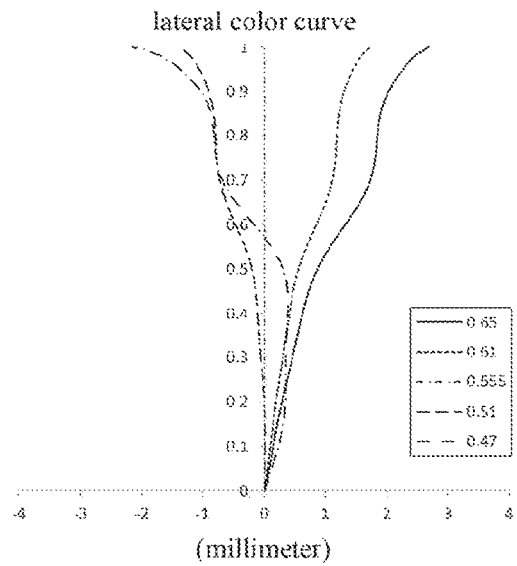
Figure 6E:
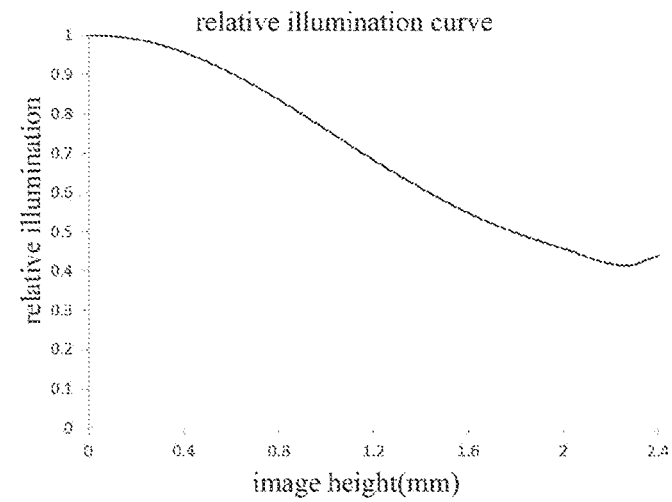

FIG. 6A shows a longitudinal aberration curve of the optical imaging system according to Embodiment 3, representing deviations of focal points of light of different wavelengths converged after passing through an optical system. FIG. 6B shows an astigmatic curve of the optical imaging system according to Embodiment 3, representing a curvature of a tangential image plane and a curvature of a sagittal image plane. FIG. 6C shows a distortion curve of the optical imaging system according to Embodiment 3, representing amounts of distortion at different viewing angles. FIG. 6D shows a lateral color curve of the optical imaging system according to Embodiment 3, representing deviations of different image heights on an image plane after light passes through the optical imaging system. FIG. 6E shows a relative illumination curve of the optical imaging system according to Embodiment 3, representing relative illumination corresponding to different image heights on the image plane. It can be seen from FIGS. 6A to 6E that the optical imaging system according to Embodiment 3 can achieve a good image quality.

Embodiment 4

Figure 7:
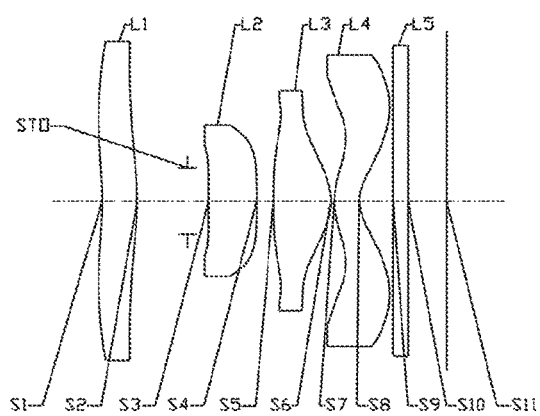
FIG. 7 is a schematic structural diagram illustrating an optical imaging system according to Embodiment 4 of the present disclosure.

An optical imaging system according to Embodiment 4 of the present disclosure is described below with reference to FIGS. 7 to 8E. FIG. 7 is a schematic structural diagram illustrating the optical imaging system according to Embodiment 4 of the present disclosure.

As shown in FIG. 7, the optical imaging system sequentially includes, along an optical axis from an object side to an image side, a first lens L1, a second lens L2, a third lens L3, a fourth lens L4 and an image plane S11. The optical imaging system may further include an electronic photosensitive element disposed on the image plane S11.

The first lens L1 has a positive refractive power, an object-side surface S1 of the first lens L1 is a concave surface, an image-side surface S2 of the first lens L1 is a convex surface, and both the object-side surface S1 and the image-side surface S2 of the first lens L1 are aspheric surfaces.

The second lens L2 has a positive refractive power, an object-side surface S3 of the second lens L2 is a convex surface, an image-side surface S4 of the second lens L2 is a convex surface, and both the object-side surface S3 and the image-side surface S4 of the second lens L2 are aspheric surfaces.

The third lens L3 has a positive refractive power, an object-side surface S5 of the third lens L3 is a convex surface, an image-side surface S6 of the third lens L3 is a convex surface, and both the object-side surface S5 and the image-side surface S6 of the third lens L3 are aspheric surfaces.

The fourth lens L4 has a negative refractive power, an object-side surface S7 of the fourth lens L4 is a convex surface and has at least one inflection point, an image-side surface S8 of the fourth lens L4 is a concave surface and has at least one inflection point, and both the object-side surface S7 and the image-side surface S8 of the fourth lens L4 are aspheric surfaces.

Alternatively, the optical imaging system may further include an optical filter L5 having an object-side surface S9 and an image-side surface S10. Light from an object sequentially passes through the surfaces S1 to S10 and is finally imaged on the image plane S11.

In the optical imaging system of the present embodiment, a diaphragm STO may also be provided, for example, between the first lens L1 and the second lens L2 for limiting light beams, to improve the image quality of the optical imaging system.

Table 10 shows the surface type, the radius of curvature, the thickness, the material and the conic coefficient of each lens of the optical imaging system in Embodiment 4, wherein the units of the radius of curvature and the thickness are millimeters (mm). Table 11 shows the higher-order coefficients applicable to each aspheric mirror surface in Embodiment 4, wherein the respective aspheric surface types may be defined by the formula (1) given in the above Embodiment 1. Table 12 shows the total effective focal length f of the optical imaging system, the effective focal lengths f1 to f4 of the lenses, the total track length TTL of the optical imaging system, the half of the diagonal length ImgH of the effective pixel area of the electronic photosensitive element on the image plane S11 and the half of the maximal field-of-view HFOV of the optical imaging system in Embodiment 4.

TABLE 10

| Surface Number | Surface Type | Radius of Curvature | Thickness | Material Refractive Index | Abbe Number | Conic Coefficient |
|---|---|---|---|---|---|---|
| OBJ | spherical | infinite | infinite | | | |
| S1 | aspheric | −5.3355 | 0.4971 | 1.67 | 20.4 | −5.9209 |
| S2 | aspheric | −3.7769 | 0.7150 | | | −18.3707 |
| STO | spherical | infinite | 0.2978 | | | 0.0000 |
| S3 | aspheric | 21.3506 | 0.6838 | 1.55 | 56.1 | 20.3667 |
| S4 | aspheric | −18.3953 | 0.2462 | | | 7.9284 |
| S5 | aspheric | 32.2900 | 0.8165 | 1.55 | 56.1 | 0.0000 |
| S6 | aspheric | −0.7676 | 0.0500 | | | −4.3338 |
| S7 | aspheric | 1.0699 | 0.3500 | 1.67 | 20.4 | −1.3881 |
| S8 | aspheric | 0.4848 | 0.4836 | | | −3.0108 |
| S9 | spherical | infinite | 0.2100 | 1.52 | 64.2 | |
| S10 | spherical | infinite | 0.5500 | | | |
| S11 | spherical | infinite | | | | |

TABLE 11

| Surface Number | A4 | A6 | A8 | A10 | A12 | A14 |
|---|---|---|---|---|---|---|
| S1 | 5.9287E−02 | −2.0174E−02 | 4.2727E−03 | −5.2417E−04 | 2.8305E−05 | 0.0000E+00 |
| S2 | 6.1108E−02 | −3.6796E−02 | 1.3571E−02 | −3.0424E−03 | 3.7325E−04 | −1.8737E−05 |
| S3 | −1.4881E−01 | 5.6854E−03 | 9.3982E−02 | −9.8729E−01 | 1.7037E+00 | −8.9382E−01 |
| S4 | −8.1807E−02 | −1.2782E−01 | −1.4113E−01 | 3.7543E−01 | −3.9943E−01 | 1.4407E−01 |
| S5 | 2.3366E−01 | −3.6276E−01 | 3.5094E−01 | −2.1112E−01 | 6.4604E−01 | −7.5356E−03 |
| S6 | −3.0842E−02 | 3.8916E−02 | 1.3186E−02 | 4.4082E−03 | −1.0470E−02 | 2.3714E−03 |
| S7 | −4.2997E−01 | 2.4761E−01 | −1.5669E−01 | 7.6219E−02 | −1.8869E−02 | 1.7697E−03 |
| S8 | −1.8845E−01 | 9.6846E−02 | −3.7668E−02 | 9.1271E−03 | −1.1786E−03 | 6.0656E−05 |

TABLE 12

| Parameter | | | | |
|---|---|---|---|---|
| f(mm) | f1(mm) | f2(mm) | f3(mm) | f4(mm) |
| Numerical Value 2.10 | 17.21 | 18.21 | 1.39 | −1.75 |

TABLE 12-continued

| Parameter | | |
|---|---|---|
| TTL(mm) | ImgH(mm) | HFOV(°) |
| Numerical Value 4.90 | 2.40 | 49.75 |

Figure 8A:
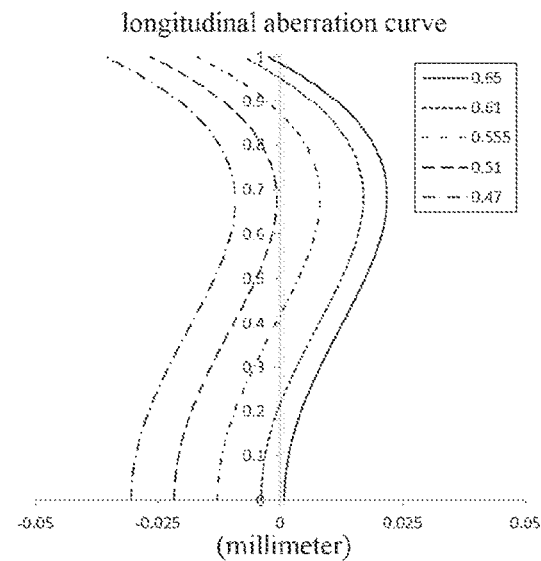
FIGS. 8A-8E respectively illustrate a longitudinal aberration curve, an astigmatic curve, a distortion curve, a lateral color curve and a relative illumination curve of the optical imaging system according to Embodiment 4.
Figure 8B:
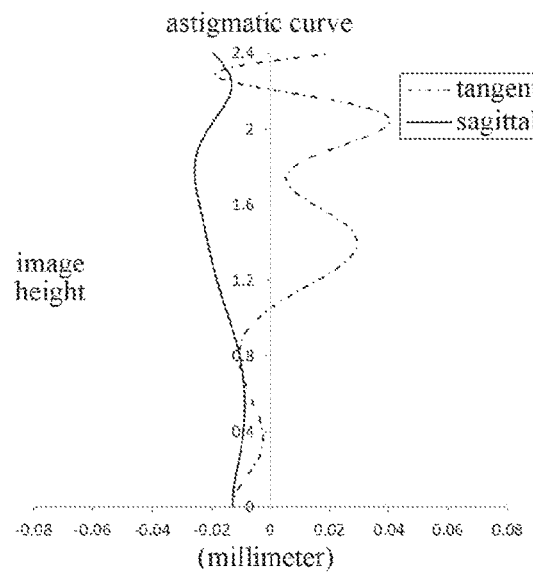
Figure 8C:
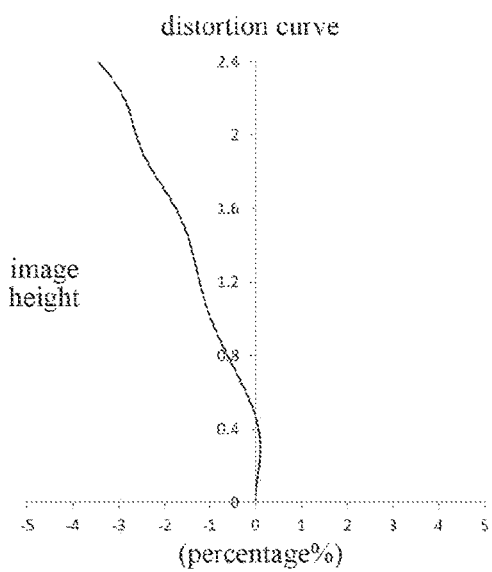
Figures 8D, 8E:
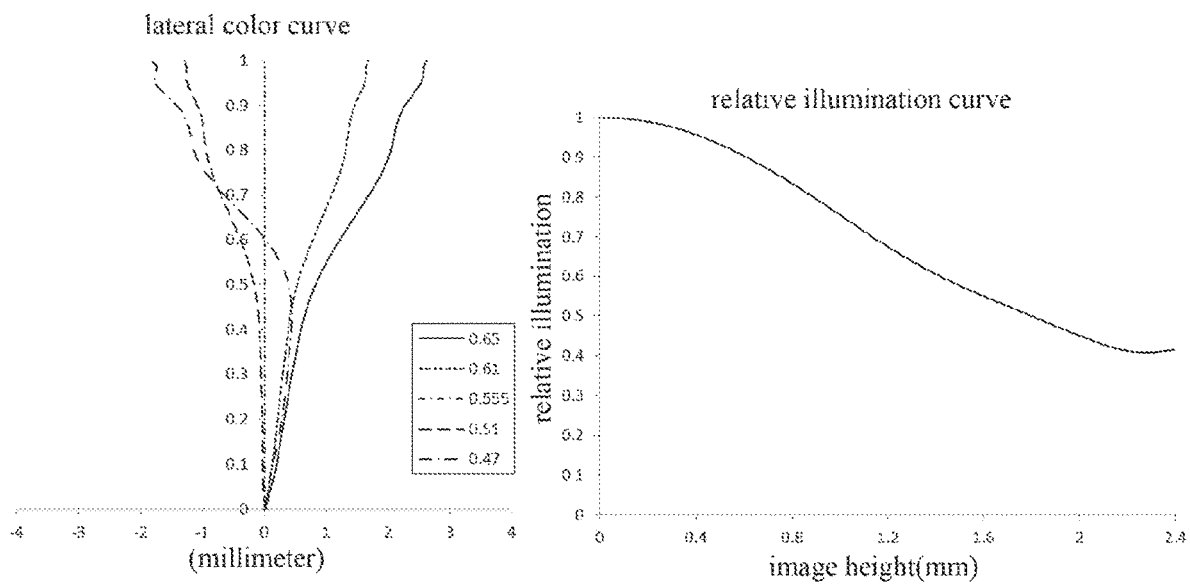

FIG. 8A shows a longitudinal aberration curve of the optical imaging system according to Embodiment 4, representing deviations of focal points of light of different wavelengths converged after passing through an optical system. FIG. 8B shows an astigmatic curve of the optical imaging system according to Embodiment 4, representing a curvature of a tangential image plane and a curvature of a sagittal image plane. FIG. 8C shows a distortion curve of the optical imaging system according to Embodiment 4, representing amounts of distortion at different viewing angles. FIG. 8D shows a lateral color curve of the optical imaging system according to Embodiment 4, representing deviations of different image heights on an image plane after light passes through the optical imaging system. FIG. 8E shows a relative illumination curve of the optical imaging system according to Embodiment 4, representing relative illumination corresponding to different image heights on the image plane. It can be seen from FIGS. 8A to 8E that the optical imaging system according to Embodiment 4 can achieve a good image quality.

Embodiment 5

Figure 9:
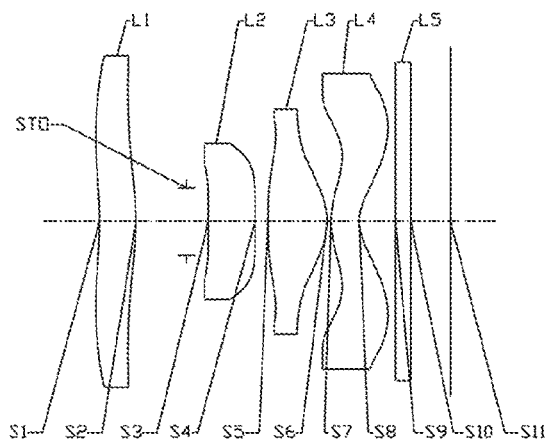
FIG. 9 is a schematic structural diagram illustrating an optical imaging system according to Embodiment 5 of the present disclosure.

An optical imaging system according to Embodiment 5 of the present disclosure is described below with reference to FIGS. 9 to 10E. FIG. 9 is a schematic structural diagram illustrating the optical imaging system according to Embodiment 5 of the present disclosure.

As shown in FIG. 9, the optical imaging system sequentially includes, along an optical axis from an object side to an image side, a first lens L1, a second lens L2, a third lens L3, a fourth lens L4 and an image plane S11. The optical imaging system may further include an electronic photosensitive element disposed on the image plane S11.

The first lens L1 has a positive refractive power, an object-side surface S1 of the first lens L1 is a concave surface, an image-side surface S2 of the first lens L1 is a convex surface, and both the object-side surface S1 and the image-side surface S2 of the first lens L1 are aspheric surfaces.

The second lens L2 has a positive refractive power, an object-side surface S3 of the second lens L2 is a convex surface, an image-side surface S4 of the second lens L2 is a concave surface, and both the object-side surface S3 and the image-side surface S4 of the second lens L2 are aspheric surfaces.

The third lens L3 has a positive refractive power, an object-side surface S5 of the third lens L3 is a convex surface, an image-side surface S6 of the third lens L3 is a convex surface, and both the object-side surface S5 and the image-side surface S6 of the third lens L3 are aspheric surfaces.

The fourth lens L4 has a negative refractive power, an object-side surface S7 of the fourth lens L4 is a convex surface and has at least one inflection point, an image-side surface S8 of the fourth lens L4 is a concave surface and has at least one inflection point, and both the object-side surface S7 and the image-side surface S8 of the fourth lens L4 are aspheric surfaces.

Alternatively, the optical imaging system may further include an optical filter L5 having an object-side surface S9 and an image-side surface S10. Light from an object sequentially passes through the surfaces S1 to S10 and is finally imaged on the image plane S11.

In the optical imaging system of the present embodiment, a diaphragm STO may also be provided, for example, between the first lens L1 and the second lens L2 for limiting light beams, to improve the image quality of the optical imaging system.

Table 13 shows the surface type, the radius of curvature, the thickness, the material and the conic coefficient of each lens of the optical imaging system in Embodiment 5, wherein the units of the radius of curvature and the thickness are millimeters (mm). Table 14 shows the higher-order coefficients applicable to each aspheric mirror surface in Embodiment 5, wherein the respective aspheric surface types may be defined by the formula (1) given in the above Embodiment 1. Table 15 shows the total effective focal length f of the optical imaging system, the effective focal lengths f1 to f4 of the lenses, the total track length TTL of the optical imaging system, the half of the diagonal length ImgH of the effective pixel area of the electronic photosensitive element on the image plane S11 and the half of the maximal field-of-view HFOV of the optical imaging system in Embodiment 5.

TABLE 13

| Surface Number | Surface Type | Radius of Curvature | Thickness | Material Refractive Index | Abbe Number | Conic Coefficient |
|---|---|---|---|---|---|---|
| OBJ | spherical | infinite | infinite | | | |
| S1 | aspheric | −5.0368 | 0.5075 | 1.64 | 23.5 | −6.1429 |
| S2 | aspheric | −3.4988 | 0.7039 | | | −26.8144 |
| STO | spherical | infinite | 0.3057 | | | |
| S3 | aspheric | 18.8386 | 0.6511 | 1.55 | 56.1 | 20.3667 |
| S4 | aspheric | 29.4088 | 0.1894 | | | 7.9284 |
| S5 | aspheric | 13.9462 | 0.8270 | 1.55 | 56.1 | 0.0000 |
| S6 | aspheric | −0.8184 | 0.0500 | | | −4.1466 |
| S7 | aspheric | 1.1716 | 0.3903 | 1.67 | 20.4 | −1.4426 |
| S8 | aspheric | 0.5450 | 0.5113 | | | −3.2277 |
| S9 | spherical | infinite | 0.2100 | 1.52 | 64.2 | |
| S10 | spherical | infinite | 0.5540 | | | |
| S11 | spherical | infinite | | | | |

TABLE 14

| Surface Number | A4 | A6 | A8 | A10 | A12 | A14 |
|---|---|---|---|---|---|---|
| S1 | 6.6925E−02 | −2.7489E−02 | 7.1919E−03 | −1.0273E−03 | 5.9839E−05 | 0.0000E+00 |
| S2 | 5.1807E−02 | −3.6690E−02 | 1.6372E−02 | −4.2085E−03 | 5.5814E−04 | −2.9059E−05 |
| S3 | −1.9607E−01 | 1.8470E−01 | −1.0192E−01 | −1.2674E+00 | 2.7884E+00 | −1.7473E+00 |
| S4 | −1.5153E−01 | 6.3803E−02 | −4.9457E−01 | 7.4055E−01 | −5.9016E−01 | 1.8607E−01 |
| S5 | 1.8882E−01 | −2.5719E−01 | 2.1884E−01 | −1.2943E−01 | 4.0084E−02 | −4.7204E−03 |
| S6 | −4.8900E−02 | 6.7884E−02 | 3.8017E−02 | −5.1088E−02 | 1.6760E−02 | −1.7970E−03 |
| S7 | −3.6605E−01 | 1.9925E−01 | −1.2920E−01 | 5.7970E−02 | −1.2466E−02 | 1.0053E−03 |
| S8 | −1.5304E−01 | 6.0152E−02 | −1.8197E−02 | 3.2496E−03 | −3.1456E−04 | 1.6805E−05 |

TABLE 15

| | Parameter | | | |
|---|---|---|---|---|
| f(mm) | f1(mm) | f2(mm) | f3(mm) | f4(mm) |
| Numerical Value 2.10 | 15.74 | 93.96 | 1.44 | −2.04 |

| | Parameter | |
|---|---|---|
| TTL(mm) | ImgH(mm) | HFOV(°) |
| Numerical Value 4.90 | 2.40 | 49.63 |

Figure 10A:
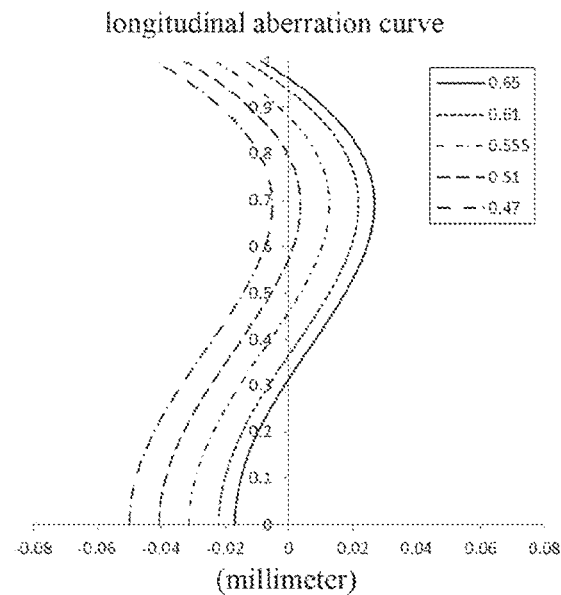
FIGS. 10A-10E respectively illustrate a longitudinal aberration curve, an astigmatic curve, a distortion curve, a lateral color curve and a relative illumination curve of the optical imaging system according to Embodiment 5.
Figure 10B:
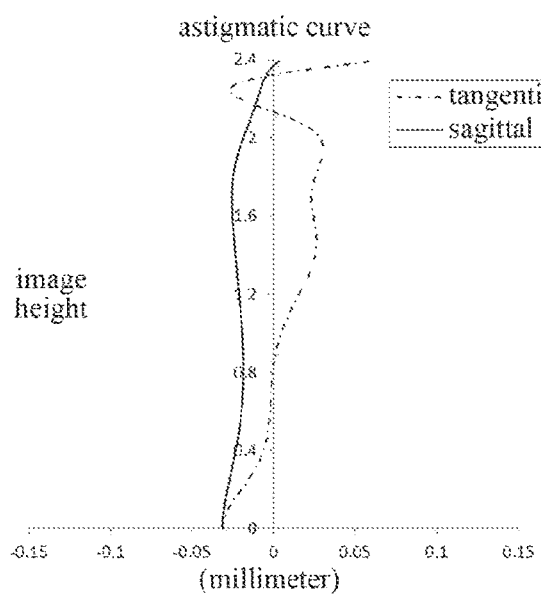
Figure 10C:
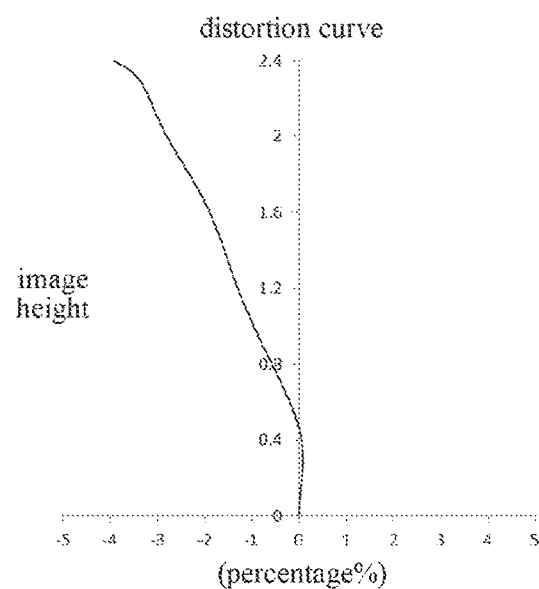
Figure 10D:
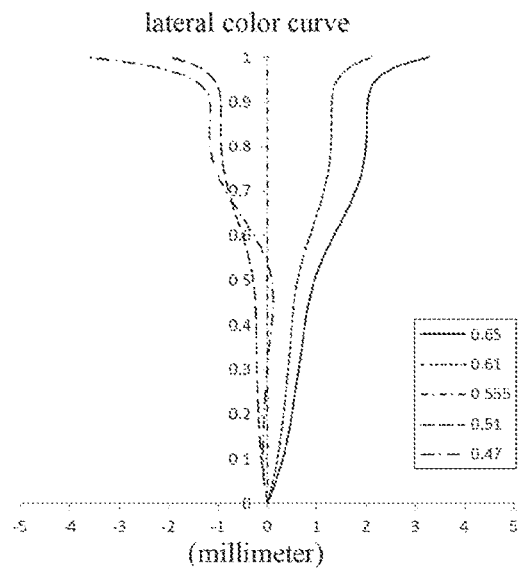
Figure 10E:
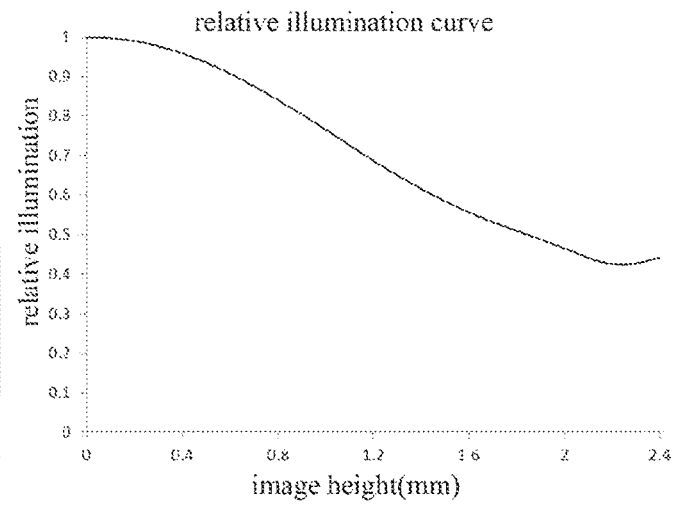

FIG. 10A shows a longitudinal aberration curve of the optical imaging system according to Embodiment 5, representing deviations of focal points of light of different wavelengths converged after passing through an optical system. FIG. 10B shows an astigmatic curve of the optical imaging system according to Embodiment 5, representing a curvature of a tangential image plane and a curvature of a sagittal image plane. FIG. 10C shows a distortion curve of the optical imaging system according to Embodiment 5, representing amounts of distortion at different viewing angles. FIG. 10D shows a lateral color curve of the optical imaging system according to Embodiment 5, representing deviations of different image heights on an image plane after light passes through the optical imaging system. FIG. 10E shows a relative illumination curve of the optical imaging system according to Embodiment 5, representing relative illumination corresponding to different image heights on the image plane. It can be seen from FIGS. 10A to 10E that the optical imaging system according to Embodiment 5 can achieve a good image quality.

Embodiment 6

Figure 11:
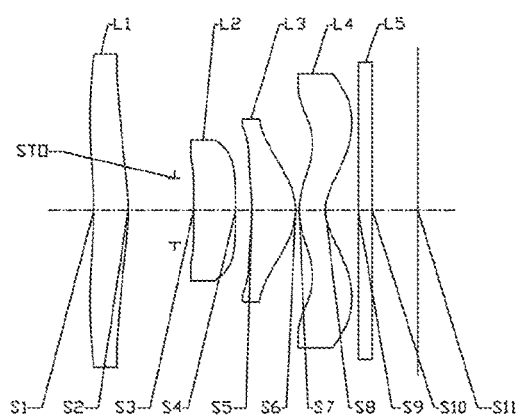
FIG. 11 is a schematic structural diagram illustrating an optical imaging system according to Embodiment 6 of the present disclosure.

An optical imaging system according to Embodiment 6 of the present disclosure is described below with reference to FIGS. 11 to 12E. FIG. 11 is a schematic structural diagram illustrating the optical imaging system according to Embodiment 6 of the present disclosure.

As shown in FIG. 11, the optical imaging system sequentially includes, along an optical axis from an object side to an image side, a first lens L1, a second lens L2, a third lens L3, a fourth lens L4 and an image plane S11. The optical imaging system may further include an electronic photosensitive element disposed on the image plane S11.

The first lens L1 has a positive refractive power, an object-side surface S1 of the first lens L1 is a concave surface, an image-side surface S2 of the first lens L1 is a convex surface, and both the object-side surface S1 and the image-side surface S2 of the first lens L1 are aspheric surfaces.

The second lens L2 has a positive refractive power, an object-side surface S3 of the second lens L2 is a convex surface, an image-side surface S4 of the second lens L2 is a convex surface, and both the object-side surface S3 and the image-side surface S4 of the second lens L2 are aspheric surfaces.

The third lens L3 has a positive refractive power, an object-side surface S5 of the third lens L3 is a concave surface, an image-side surface S6 of the third lens L3 is a convex surface, and both the object-side surface S5 and the image-side surface S6 of the third lens L3 are aspheric surfaces.

The fourth lens L4 has a negative refractive power, an object-side surface S7 of the fourth lens L4 is a convex surface and has at least one inflection point, an image-side surface S8 of the fourth lens L4 is a concave surface and has at least one inflection point, and both the object-side surface S7 and the image-side surface S8 of the fourth lens L4 are aspheric surfaces.

Alternatively, the optical imaging system may further include an optical filter L5 having an object-side surface S9 and an image-side surface S10. Light from an object sequentially passes through the surfaces S1 to S10 and is finally imaged on the image plane S11.

In the optical imaging system of the present embodiment, a diaphragm STO may also be provided, for example, between the first lens L1 and the second lens L2 for limiting light beams, to improve the image quality of the optical imaging system.

Table 16 shows the surface type, the radius of curvature, the thickness, the material and the conic coefficient of each lens of the optical imaging system in Embodiment 6, wherein the units of the radius of curvature and the thickness are millimeters (mm). Table 17 shows the higher-order coefficients applicable to each aspheric mirror surface in Embodiment 6, wherein the respective aspheric surface types may be defined by the formula (1) given in the above Embodiment 1. Table 18 shows the total effective focal length f of the optical imaging system, the effective focal lengths f1 to f4 of the lenses, the total track length TTL of the optical imaging system, the half of the diagonal length ImgH of the effective pixel area of the electronic photosensitive element on the image plane S11 and the half of the maximal field-of-view HFOV of the optical imaging system in Embodiment 6.

TABLE 16

| Surface Number | Surface Type | Radius of Curvature | Thickness | Material Refractive Index | Material Abbe Number | Conic Coefficient |
|---|---|---|---|---|---|---|
| OBJ | spherical | infinite | infinite | | | |
| S1 | aspheric | −5.2344 | 0.5077 | 1.64 | 23.5 | −4.1958 |
| S2 | aspheric | −3.4064 | 0.6866 | | | −26.8144 |
| STO | spherical | infinite | 0.2820 | | | |
| S3 | aspheric | 23.8790 | 0.6227 | 1.55 | 56.1 | 20.3667 |
| S4 | aspheric | −7.5563 | 0.2380 | | | 0.0000 |
| S5 | aspheric | −2.6138 | 0.6585 | 1.55 | 56.1 | 0.0000 |
| S6 | aspheric | −0.7911 | 0.0500 | | | −2.1632 |
| S7 | aspheric | 1.0171 | 0.3861 | 1.67 | 20.4 | −1.8868 |
| S8 | aspheric | 0.5717 | 0.4853 | | | −3.0908 |
| S9 | spherical | infinite | 0.2100 | 1.52 | 64.2 | |
| S10 | spherical | infinite | 0.6730 | | | |
| S11 | spherical | infinite | | | | |

TABLE 17

| Surface Number | A4 | A6 | A8 | A10 | A12 | A14 |
|---|---|---|---|---|---|---|
| S1 | 6.3257E−02 | −2.6301E−02 | 6.7312E−03 | −9.3218E−04 | 5.2983E−05 | 0.0000E+00 |
| S2 | 4.0653E−02 | −2.9695E−02 | 1.2730E−02 | −3.0652E−03 | 3.7728E−04 | −1.7992E−05 |
| S3 | −8.4259E−02 | −4.5761E−01 | 1.8444E+00 | −4.1777E+00 | 4.8146E+00 | −2.2954E+00 |
| S4 | 4.1887E−02 | −2.2822E−01 | 0.0000E+00 | 0.0000E+00 | 0.0000E+00 | 0.0000E+00 |
| S5 | 4.2477E−01 | −6.0170E−01 | 6.3585E−01 | −4.9393E−01 | 2.0314E−01 | −3.1350E−02 |
| S6 | 1.3979E−01 | −3.7441E−01 | 5.1673E−01 | −3.2174E−01 | 9.4214E−02 | −1.0195E−02 |
| S7 | −3.1395E−01 | 1.3400E−01 | −5.4149E−02 | 1.8009E−02 | −3.0483E−03 | 1.8764E−04 |
| S8 | −1.6191E−01 | 6.3041E−02 | −1.8531E−02 | 3.3692E−03 | −3.7879E−04 | 2.4400E−05 |

TABLE 18

| | Parameter | | | | |
|---|---|---|---|---|---|
| | f(mm) | f1(mm) | f2(mm) | f3(mm) | f4(mm) |
| Numerical Value | 2.13 | 13.65 | 10.59 | 1.84 | −3.00 |

| | Parameter | | |
|---|---|---|---|
| | TTL(mm) | ImgH(mm) | HFOV(°) |
| Numerical Value | 4.80 | 2.40 | 48.90 |

Figure 12A:
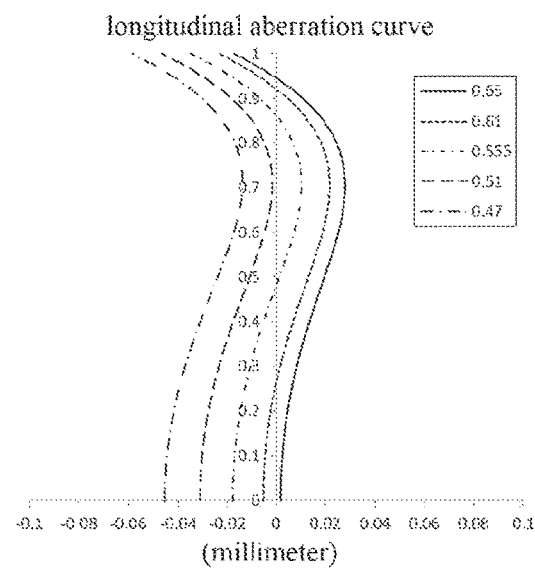
FIGS. 12A-12E respectively illustrate a longitudinal aberration curve, an astigmatic curve, a distortion curve, a lateral color curve and a relative illumination curve of the optical imaging system according to Embodiment 6.
Figure 12B:
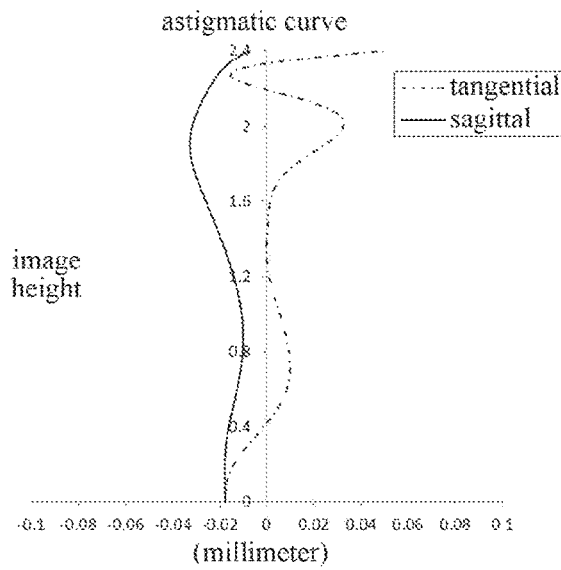
Figure 12C:
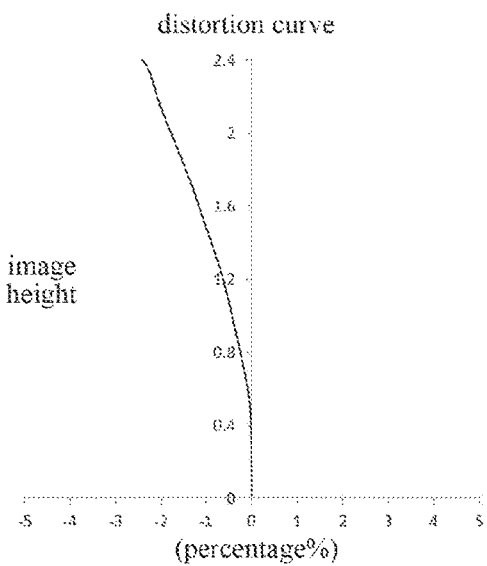
Figure 12D:
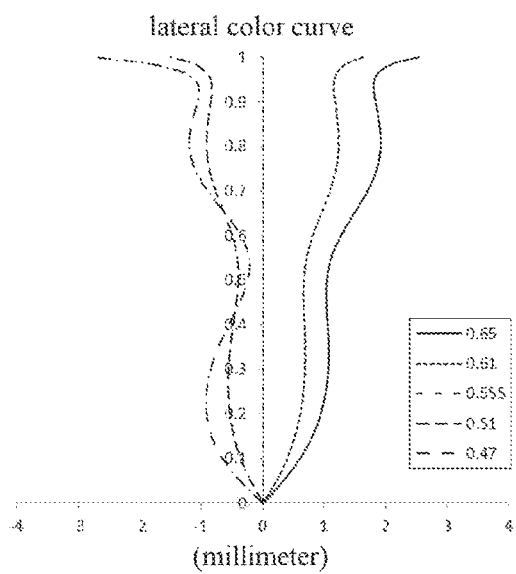
Figure 12E:
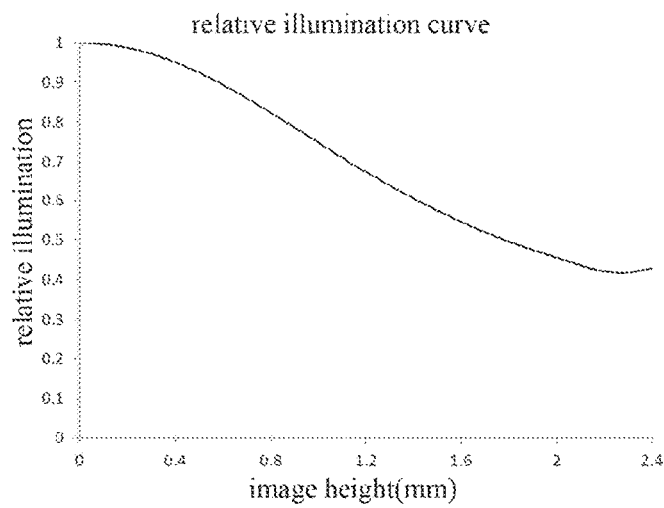

FIG. 12A shows a longitudinal aberration curve of the optical imaging system according to Embodiment 6, representing deviations of focal points of light of different wavelengths converged after passing through an optical system. FIG. 12B shows an astigmatic curve of the optical imaging system according to Embodiment 6, representing a curvature of a tangential image plane and a curvature of a sagittal image plane. FIG. 12C shows a distortion curve of the optical imaging system according to Embodiment 6, representing amounts of distortion at different viewing angles. FIG. 12D shows a lateral color curve of the optical imaging system according to Embodiment 6, representing deviations of different image heights on an image plane after light passes through the optical imaging system. FIG. 12E shows a relative illumination curve of the optical imaging system according to Embodiment 6, representing relative illumination corresponding to different image heights on the image plane. It can be seen from FIGS. 12A to 12E that the optical imaging system according to Embodiment 6 can achieve a good image quality.

Embodiment 7

Figure 13:
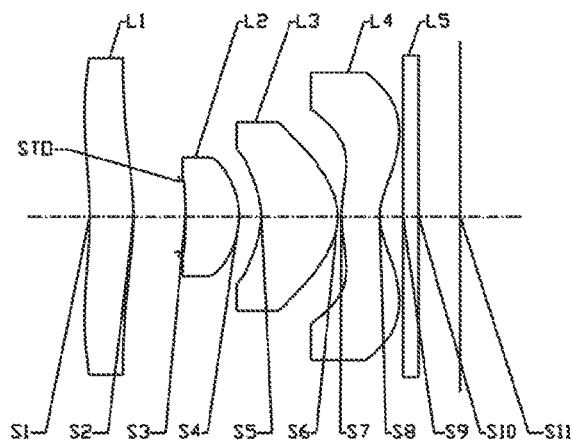
FIG. 13 is a schematic structural diagram illustrating an optical imaging system according to Embodiment 7 of the present disclosure.

An optical imaging system according to Embodiment 7 of the present disclosure is described below with reference to FIGS. 13 to 14E. FIG. 13 is a schematic structural diagram illustrating the optical imaging system according to Embodiment 7 of the present disclosure.

As shown in FIG. 13, the optical imaging system sequentially includes, along an optical axis from an object side to an image side, a first lens L1, a second lens L2, a third lens L3, a fourth lens L4 and an image plane S11. The optical imaging system may further include an electronic photosensitive element disposed on the image plane S11.

The first lens L1 has a positive refractive power, an object-side surface S1 of the first lens L1 is a concave surface, an image-side surface S2 of the first lens L1 is a convex surface, and both the object-side surface S1 and the image-side surface S2 of the first lens L1 are aspheric surfaces.

The second lens L2 has a positive refractive power, an object-side surface S3 of the second lens L2 is a concave surface, an image-side surface S4 of the second lens L2 is a convex surface, and both the object-side surface S3 and the image-side surface S4 of the second lens L2 are aspheric surfaces.

The third lens L3 has a positive refractive power, an object-side surface S5 of the third lens L3 is a concave surface, an image-side surface S6 of the third lens L3 is a convex surface, and both the object-side surface S5 and the image-side surface S6 of the third lens L3 are aspheric surfaces.

The fourth lens L4 has a negative refractive power, an object-side surface S7 of the fourth lens L4 is a convex surface and has at least one inflection point, an image-side surface S8 of the fourth lens L4 is a concave surface and has at least one inflection point, and both the object-side surface S7 and the image-side surface S8 of the fourth lens L4 are aspheric surfaces.

Alternatively, the optical imaging system may further include an optical filter L5 having an object-side surface S9 and an image-side surface S10. Light from an object sequentially passes through the surfaces S1 to S10 and is finally imaged on the image plane S11.

In the optical imaging system of the present embodiment, a diaphragm STO may also be provided, for example, between the first lens L1 and the second lens L2 for limiting light beams, to improve the image quality of the optical imaging system.

Table 19 shows the surface type, the radius of curvature, the thickness, the material and the conic coefficient of each lens of the optical imaging system in Embodiment 7, wherein the units of the radius of curvature and the thickness are millimeters (mm). Table 20 shows the higher-order coefficients applicable to each aspheric mirror surface in Embodiment 7, wherein the respective aspheric surface types may be defined by the formula (1) given in the above Embodiment 1. Table 21 shows the total effective focal length f of the optical imaging system, the effective focal lengths f1 to f4 of the lenses, the total track length TTL of the optical imaging system, the half of the diagonal length ImgH of the effective pixel area of the electronic photosensitive element on the image plane S11 and the half of the maximal field-of-view HFOV of the optical imaging system in Embodiment 7.

TABLE 19

| Surface Number | Surface Type | Radius of Curvature | Thickness | Material Refractive Index | Abbe Number | Conic Coefficient |
|---|---|---|---|---|---|---|
| OBJ | spherical | infinite | infinite | | | |
| S1 | aspheric | −4.7379 | 0.5871 | 1.64 | 23.5 | −23.3304 |
| S2 | aspheric | −3.2131 | 0.6018 | | | −35.6759 |
| STO | spherical | infinite | 0.0889 | | | |
| S3 | aspheric | −7.2264 | 0.7187 | 1.55 | 56.1 | 18.9378 |
| S4 | aspheric | −0.9828 | 0.2942 | | | 0.0000 |
| S5 | aspheric | −0.9562 | 1.0286 | 1.55 | 56.1 | 0.0000 |
| S6 | aspheric | −0.7466 | 0.0500 | | | −3.1911 |
| S7 | aspheric | 1.8371 | 0.5102 | 1.67 | 20.4 | −3.2837 |
| S8 | aspheric | 0.7099 | 0.3105 | | | −4.9882 |
| S9 | spherical | infinite | 0.2100 | 1.52 | 64.2 | |
| S10 | spherical | infinite | 0.5527 | | | |
| S11 | spherical | infinite | | | | |

TABLE 20

| Surface Number | A4 | A6 | A8 | A10 | A12 | A14 | A16 |
|---|---|---|---|---|---|---|---|
| S1 | 4.7508E−02 | −2.3724E−02 | 7.3202E−03 | −1.1078E−03 | 6.2072E−05 | 0.0000E+00 | 0.0000E+00 |
| S2 | 2.3040E−02 | −1.6866E−02 | 8.5915E−03 | −1.8247E−03 | 5.2246E−05 | 1.7201E−05 | 0.0000E+00 |
| S3 | −2.4388E−01 | 1.8928E+00 | −2.0612E+01 | 1.0857E+02 | −2.8229E+02 | 2.6782E+02 | 0.0000E+00 |
| S4 | 1.5537E−01 | 4.1888E−01 | −3.1657E+00 | 1.1137E+01 | −2.4321E+01 | 3.0163E+01 | −1.6886E+01 |
| S5 | 6.0416E−01 | −4.6410E−01 | 2.7616E−01 | 2.9481E−01 | −3.9695E−01 | 3.0777E−01 | −7.3135E−02 |
| S6 | −1.6516E−01 | 7.7029E−02 | 4.7889E−02 | −1.9950E−01 | 1.7413E−01 | −4.6544E−02 | 0.0000E+00 |
| S7 | −2.9937E−01 | 1.5168E−01 | −1.3671E−01 | 5.6540E−02 | −5.3485E−03 | −7.9041E−04 | 0.0000E+00 |
| S8 | −1.2502E−01 | 3.2407E−02 | −7.1373E−03 | 7.3659E−04 | −3.1260E−05 | 4.5765E−07 | 0.0000E+00 |

TABLE 21

| | Parameter | | | | |
|---|---|---|---|---|---|
| | f(mm) | f1(mm) | f2(mm) | f3(mm) | f4(mm) |
| Numerical Value | 2.07 | 13.46 | 2.00 | 2.28 | −2.12 |

| | Parameter | | |
|---|---|---|---|
| | TTL(mm) | ImgH(mm) | HFOV(°) |
| Numerical Value | 4.95 | 2.35 | 48.98 |

Figure 14A:
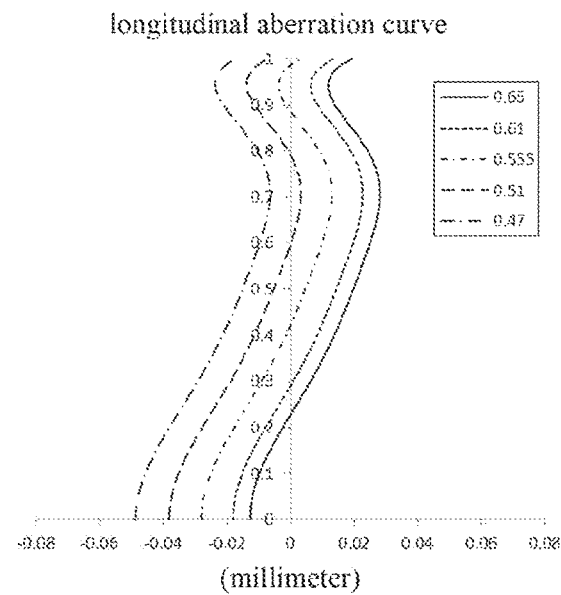
FIGS. 14A-14E respectively illustrate a longitudinal aberration curve, an astigmatic curve, a distortion curve, a lateral color curve and a relative illumination curve of the optical imaging system according to Embodiment 7.
Figure 14B:
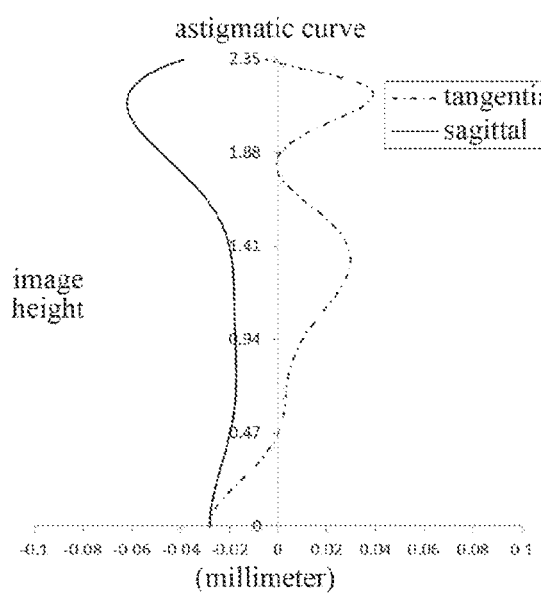
Figure 14C:
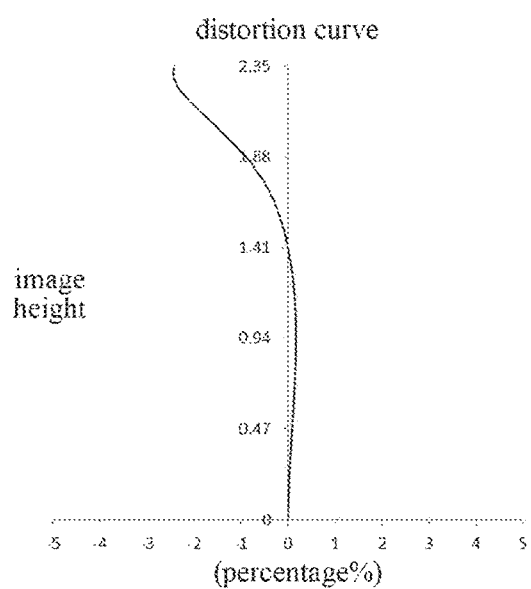
Figure 14D:
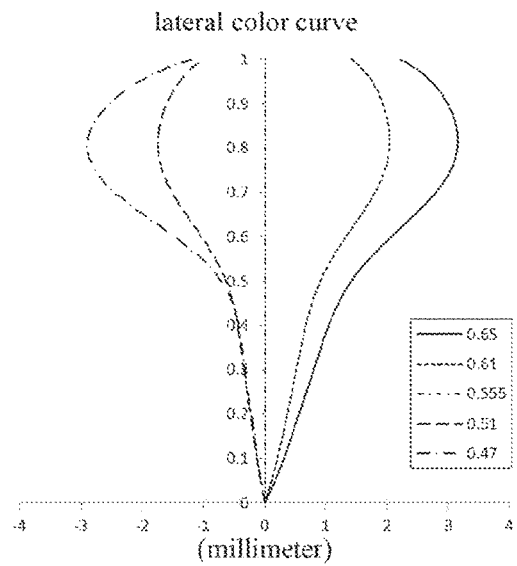
Figure 14E:
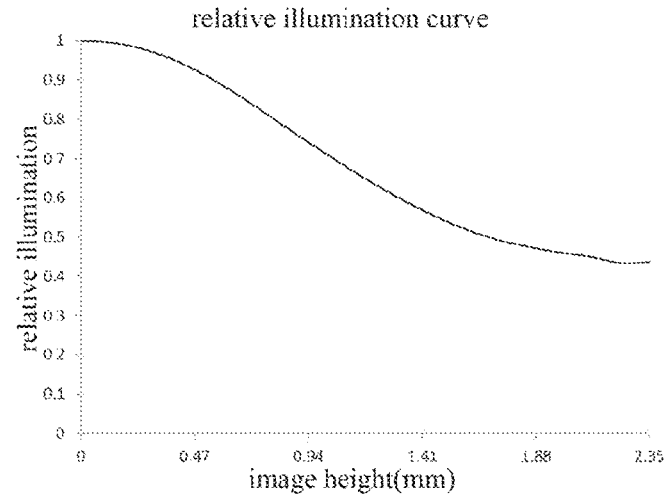

FIG. 14A shows a longitudinal aberration curve of the optical imaging system according to Embodiment 7, representing deviations of focal points of light of different wavelengths converged after passing through an optical system. FIG. 14B shows an astigmatic curve of the optical imaging system according to Embodiment 7, representing a curvature of a tangential image plane and a curvature of a sagittal image plane. FIG. 14C shows a distortion curve of the optical imaging system according to Embodiment 7, representing amounts of distortion at different viewing angles. FIG. 14D shows a lateral color curve of the optical imaging system according to Embodiment 7, representing deviations of different image heights on an image plane after light passes through the optical imaging system. FIG. 14E shows a relative illumination curve of the optical imaging system according to Embodiment 7, representing relative illumination corresponding to different image heights on the image plane. It can be seen from FIGS. 14A to 14E that the optical imaging system according to Embodiment 7 can achieve a good image quality.

Embodiment 8

Figure 15:
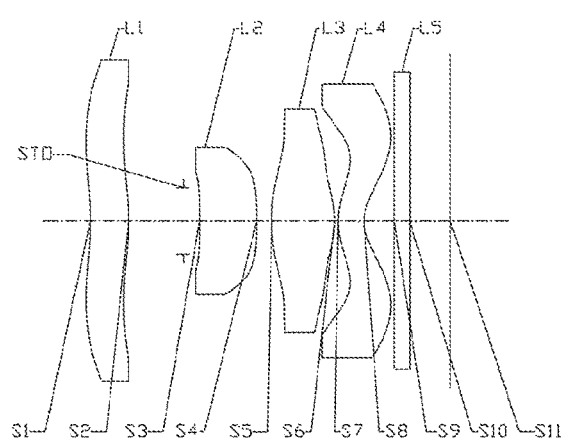
FIG. 15 is a schematic structural diagram illustrating an optical imaging system according to Embodiment 8 of the present disclosure.

An optical imaging system according to Embodiment 8 of the present disclosure is described below with reference to FIGS. 15 to 16E. FIG. 15 is a schematic structural diagram illustrating the optical imaging system according to Embodiment 8 of the present disclosure.

As shown in FIG. 15, the optical imaging system sequentially includes, along an optical axis from an object side to an image side, a first lens L1, a second lens L2, a third lens L3, a fourth lens L4 and an image plane S11. The optical imaging system may further include an electronic photosensitive element disposed on the image plane S11.

The first lens L1 has a positive refractive power, an object-side surface S1 of the first lens L1 is a concave surface, an image-side surface S2 of the first lens L1 is a convex surface, and both the object-side surface S1 and the image-side surface S2 of the first lens L1 are aspheric surfaces.

The second lens L2 has a positive refractive power, an object-side surface S3 of the second lens L2 is a concave surface, an image-side surface S4 of the second lens L2 is a convex surface, and both the object-side surface S3 and the image-side surface S4 of the second lens L2 are aspheric surfaces.

The third lens L3 has a positive refractive power, an object-side surface S5 of the third lens L3 is a convex surface, an image-side surface S6 of the third lens L3 is a convex surface, and both the object-side surface S5 and the image-side surface S6 of the third lens L3 are aspheric surfaces.

The fourth lens L4 has a negative refractive power, an object-side surface S7 of the fourth lens L4 is a convex surface and has at least one inflection point, an image-side surface S8 of the fourth lens L4 is a concave surface and has at least one inflection point, and both the object-side surface S7 and the image-side surface S8 of the fourth lens L4 are aspheric surfaces.

Alternatively, the optical imaging system may further include an optical filter L5 having an object-side surface S9 and an image-side surface S10. Light from an object sequentially passes through the surfaces S1 to S10 and is finally imaged on the image plane S11.

In the optical imaging system of the present embodiment, a diaphragm STO may also be provided, for example, between the first lens L1 and the second lens L2 for limiting light beams, to improve the image quality of the optical imaging system.

Table 22 shows the surface type, the radius of curvature, the thickness, the material and the conic coefficient of each lens of the optical imaging system in Embodiment 8, wherein the units of the radius of curvature and the thickness are millimeters (mm). Table 23 shows the higher-order coefficients applicable to each aspheric mirror surface in Embodiment 8, wherein the respective aspheric surface types may be defined by the formula (1) given in the above Embodiment 1. Table 24 shows the total effective focal length f of the optical imaging system, the effective focal lengths f1 to f4 of the lenses, the total track length TTL of the optical imaging system, the half of the diagonal length ImgH of the effective pixel area of the electronic photosensitive element on the image plane S11 and the half of the maximal field-of-view HFOV of the optical imaging system in Embodiment 8.

TABLE 22

| Surface Number | Surface Type | Radius of Curvature | Thickness | Material Refractive Index | Abbe Number | Conic Coefficient |
|---|---|---|---|---|---|---|
| OBJ | spherical | infinite | infinite | | | |
| S1 | aspheric | −3.8380 | 0.5179 | 1.65 | 23.5 | −18.9290 |
| S2 | aspheric | −3.2641 | 0.7462 | | | −12.0008 |
| STO | spherical | infinite | 0.2208 | | | |
| S3 | aspheric | −33.6367 | 0.7763 | 1.55 | 56.1 | 20.3667 |
| S4 | aspheric | −7.4822 | 0.2016 | | | 7.9284 |
| S5 | aspheric | 2.9290 | 0.8642 | 1.55 | 56.1 | −2.2110 |
| S6 | aspheric | −1.2434 | 0.0500 | | | −4.0445 |
| S7 | aspheric | 0.9968 | 0.3500 | 1.67 | 20.4 | −6.2138 |
| S8 | aspheric | 0.5499 | 0.4130 | | | −2.9989 |
| S9 | spherical | infinite | 0.2100 | 1.52 | 64.2 | |
| S10 | spherical | infinite | 0.5500 | | | |
| S11 | spherical | infinite | | | | |

TABLE 23

| Surface Number | A4 | A6 | A8 | A10 | A12 | A14 |
|---|---|---|---|---|---|---|
| S1 | 0.0000E+00 | 6.1807E−02 | −1.9653E−02 | 3.6433E−03 | −2.8286E−04 | 2.2128E−06 |
| S2 | 1.0665E−01 | −6.3678E−02 | 2.2928E−02 | −4.5698E−03 | 4.4866E−04 | −1.6718E−05 |
| S3 | −2.5094E−01 | 9.3575E−01 | −6.1312E+00 | 1.9527E+01 | −3.2107E+01 | 2.1523E+01 |
| S4 | −2.5440E−01 | 1.3784E−01 | −1.1005E+00 | 2.1650E+00 | −1.9472E+00 | 6.5683E−01 |
| S5 | 1.2755E−01 | −1.4281E−01 | −2.2632E−02 | 5.5795E−02 | −1.8187E−02 | 1.8761E−03 |
| S6 | 2.0651E−01 | 1.8327E−01 | −5.1541E−01 | 3.6546E−01 | −1.1068E−01 | 1.2465E−02 |
| S7 | −9.3809E−03 | −2.0258E−01 | 3.5539E−02 | 4.4755E−02 | −1.7298E−02 | 1.5072E−03 |
| S8 | −1.3484E−01 | −3.4918E−02 | 5.4760E−02 | −2.2877E−02 | 4.4359E−03 | −3.3669E−04 |

TABLE 24

| | Parameter | | | | |
|---|---|---|---|---|---|
| | f(mm) | f1(mm) | f2(mm) | f3(mm) | f4(mm) |
| Numerical Value | 1.96 | 24.95 | 17.43 | 1.72 | −2.67 |

TABLE 24-continued

| | Parameter | | |
|---|---|---|---|
| | TTL(mm) | ImgH(mm) | HFOV(°) |
| Numerical Value | 4.90 | 2.26 | 50.00 |

Figure 16A:
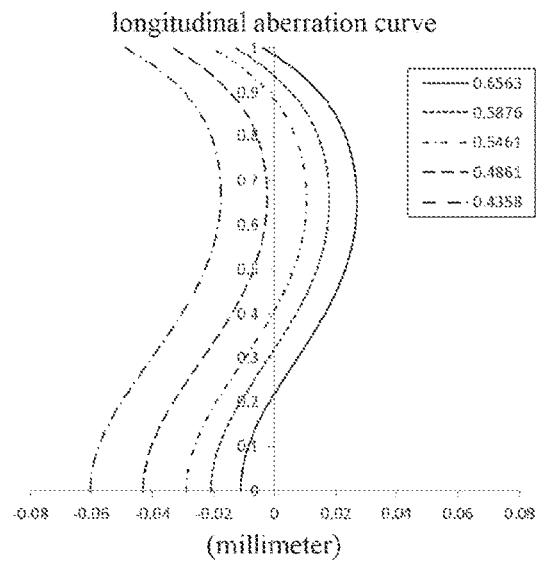
FIGS. 16A-16E respectively illustrate a longitudinal aberration curve, an astigmatic curve, a distortion curve, a lateral color curve and a relative illumination curve of the optical imaging system according to Embodiment 8.
Figure 16B:
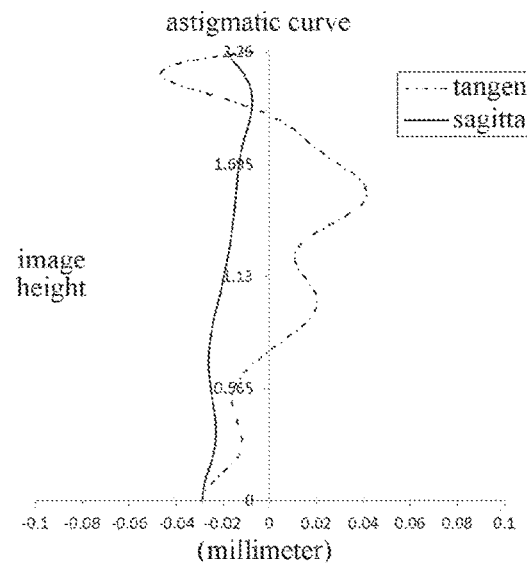
Figure 16C:
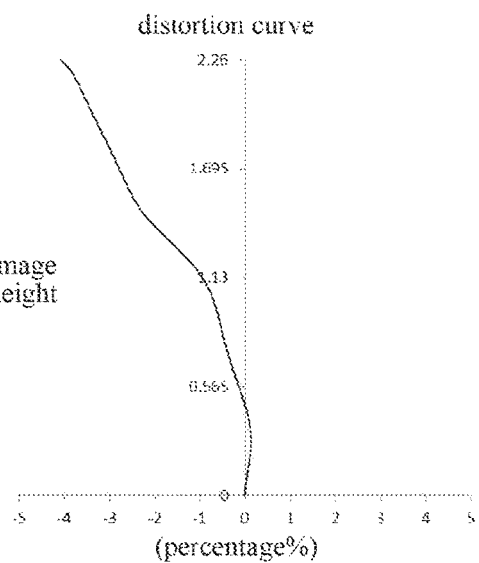
Figure 16D:
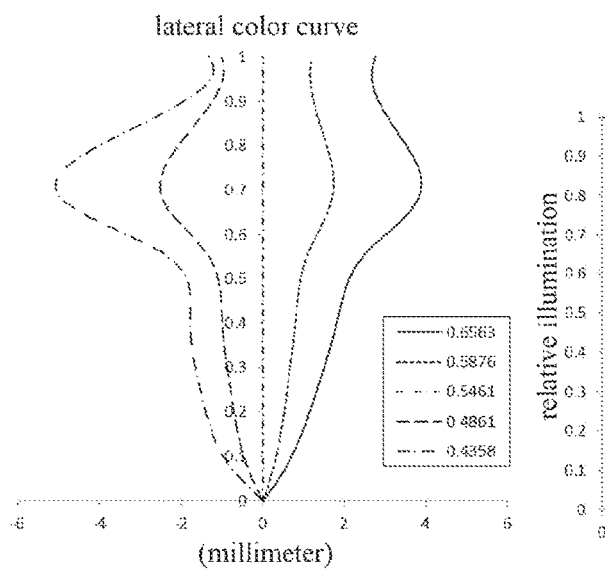
Figure 16E:
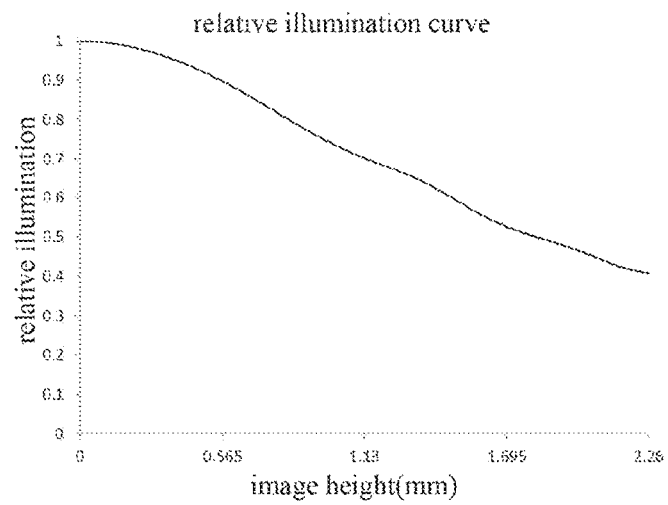

FIG. 16A shows a longitudinal aberration curve of the optical imaging system according to Embodiment 8, representing deviations of focal points of light of different wavelengths converged after passing through an optical system. FIG. 16B shows an astigmatic curve of the optical imaging system according to Embodiment 8, representing a curvature of a tangential image plane and a curvature of a sagittal image plane. FIG. 16C shows a distortion curve of the optical imaging system according to Embodiment 8, representing amounts of distortion at different viewing angles. FIG. 16D shows a lateral color curve of the optical imaging system according to Embodiment 8, representing deviations of different image heights on an image plane after light passes through the optical imaging system. FIG. 16E shows a relative illumination curve of the optical imaging system according to Embodiment 8, representing relative illumination corresponding to different image heights on the image plane. It can be seen from FIGS. 16A to 16E that the optical imaging system according to Embodiment 8 can achieve a good image quality.

Embodiment 9

Figure 17:
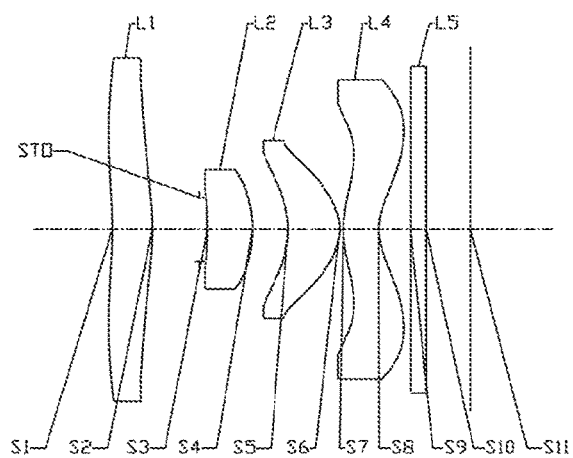
FIG. 17 is a schematic structural diagram illustrating an optical imaging system according to Embodiment 9 of the present disclosure.

An optical imaging system according to Embodiment 9 of the present disclosure is described below with reference to FIGS. 17 to 18E. FIG. 17 is a schematic structural diagram illustrating the optical imaging system according to Embodiment 9 of the present disclosure.

As shown in FIG. 17, the optical imaging system sequentially includes, along an optical axis from an object side to an image side, a first lens L1, a second lens L2, a third lens L3, a fourth lens L4 and an image plane S11. The optical imaging system may further include an electronic photosensitive element disposed on the image plane S11.

The first lens L1 has a positive refractive power, an object-side surface S1 of the first lens L1 is a concave surface, an image-side surface S2 of the first lens L1 is a convex surface, and both the object-side surface S1 and the image-side surface S2 of the first lens L1 are aspheric surfaces.

The second lens L2 has a positive refractive power, an object-side surface S3 of the second lens L2 is a concave surface, an image-side surface S4 of the second lens L2 is a convex surface, and both the object-side surface S3 and the image-side surface S4 of the second lens L2 are aspheric surfaces.

The third lens L3 has a positive refractive power, an object-side surface S5 of the third lens L3 is a concave surface, an image-side surface S6 of the third lens L3 is a convex surface, and both the object-side surface S5 and the image-side surface S6 of the third lens L3 are aspheric surfaces.

The fourth lens L4 has a negative refractive power, an object-side surface S7 of the fourth lens L4 is a convex surface and has at least one inflection point, an image-side surface S8 of the fourth lens L4 is a concave surface and has at least one inflection point, and both the object-side surface S7 and the image-side surface S8 of the fourth lens L4 are aspheric surfaces.

Alternatively, the optical imaging system may further include an optical filter L5 having an object-side surface S9 and an image-side surface S10. Light from an object sequentially passes through the surfaces S1 to S10 and is finally imaged on the image plane S11.

In the optical imaging system of the present embodiment, a diaphragm STO may also be provided, for example, between the first lens L1 and the second lens L2 for limiting light beams, to improve the image quality of the optical imaging system.

Table 25 shows the surface type, the radius of curvature, the thickness, the material and the conic coefficient of each lens of the optical imaging system in Embodiment 9, wherein the units of the radius of curvature and the thickness are millimeters (mm). Table 26 shows the higher-order coefficients applicable to each aspheric mirror surface in Embodiment 9, wherein the respective aspheric surface types may be defined by the formula (1) given in the above Embodiment 1. Table 27 shows the total effective focal length f of the optical imaging system, the effective focal lengths f1 to f4 of the lenses, the total track length TTL of the optical imaging system, the half of the diagonal length ImgH of the effective pixel area of the electronic photosensitive element on the image plane S11 and the half of the maximal field-of-view HFOV of the optical imaging system in Embodiment 9.

TABLE 25

| Surface Number | Surface Type | Radius of Curvature | Thickness | Refractive Index | Abbe Number | Conic Coefficient |
|---|---|---|---|---|---|---|
| OBJ | spherical | infinite | infinite | | | |
| S1 | aspheric | −6.2332 | 0.5355 | 1.65 | 23.5 | −6.8651 |
| S2 | aspheric | −3.7103 | 0.6298 | | | −35.6501 |
| STO | spherical | infinite | 0.1068 | | | |
| S3 | aspheric | −6.3529 | 0.6046 | 1.55 | 56.1 | 18.9364 |
| S4 | aspheric | −1.6261 | 0.4843 | | | 0.0000 |
| S5 | aspheric | −1.1909 | 0.6905 | 1.55 | 56.1 | 0.0000 |
| S6 | aspheric | −0.6731 | 0.0500 | | | −1.8616 |
| S7 | aspheric | 1.5238 | 0.4702 | 1.67 | 20.4 | −1.2418 |
| S8 | aspheric | 0.6943 | 0.4267 | | | −4.5296 |
| S9 | spherical | infinite | 0.2100 | 1.52 | 64.2 | |
| S10 | spherical | infinite | 0.5916 | | | |
| S11 | spherical | infinite | | | | |

TABLE 26

| Surface Number | A4 | A6 | A8 | A10 | A12 | A14 | A16 |
|---|---|---|---|---|---|---|---|
| S1 | 5.3640E−02 | −2.4023E−02 | 7.0560E−03 | −1.1209E−03 | 7.1056E−05 | 0.0000E+00 | 0.0000E+00 |
| S2 | 2.7920E−02 | −2.2006E−02 | 1.1429E−02 | −3.2859E−03 | 4.6181E−04 | −2.4094E−05 | 0.0000E+00 |
| S3 | −1.2200E−01 | 3.3876E−01 | −2.0485E+00 | 4.3005E+00 | −5.7356E+00 | 5.1460E+00 | 0.0000E+00 |
| S4 | 2.2352E−02 | −5.0852E−01 | 3.2277E+00 | −1.0985E+01 | 2.0356E+01 | −2.0225E+01 | 8.1600E+00 |
| S5 | 2.3449E−01 | −2.7867E−01 | 2.9778E−01 | 2.2000E−01 | −4.7241E−01 | 2.8089E−01 | −6.0781E−02 |
| S6 | 1.1179E−01 | −6.9193E−01 | 1.1772E+00 | −1.2014E+00 | 7.0601E−01 | −1.6416E−01 | 0.0000E+00 |
| S7 | −2.4249E−01 | 6.9167E−02 | 9.6543E−03 | −2.4487E−02 | 9.8264E−03 | −1.2282E−03 | 0.0000E+00 |
| S8 | −9.8944E−02 | 3.4574E−02 | −1.0581E−02 | 1.5575E−03 | −9.1089E−05 | 1.7772E−06 | 0.0000E+00 |

TABLE 27

| Parameter | | | | |
|---|---|---|---|---|
| f(mm) | f1(mm) | f2(mm) | f3(mm) | f4(mm) |
| Numerical Value 2.11 | 13.10 | 3.83 | 1.93 | −2.47 |

| Parameter | | |
|---|---|---|
| TTL(mm) | ImgH(mm) | HFOV(°) |
| Numerical Value 4.80 | 2.40 | 49.11 |

Figure 18A:
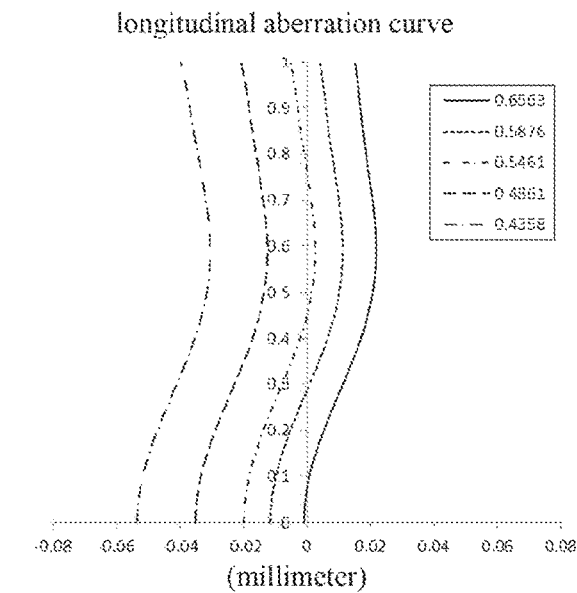
FIGS. 18A-18E respectively illustrate a longitudinal aberration curve, an astigmatic curve, a distortion curve, a lateral color curve and a relative illumination curve of the optical imaging system according to Embodiment 9.
Figure 18B:
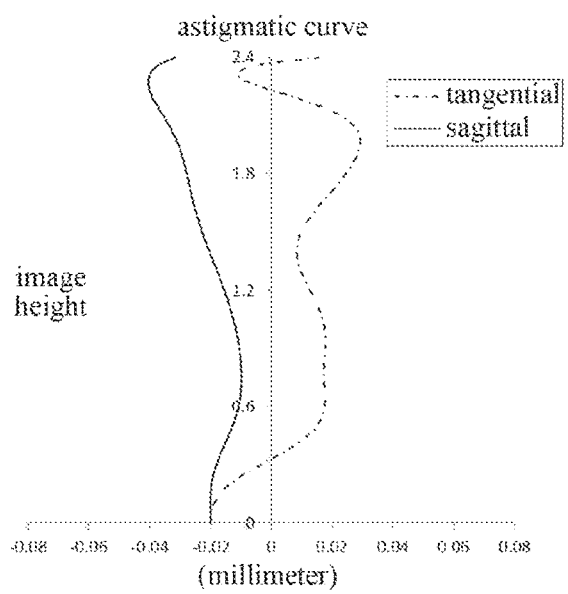
Figure 18C:
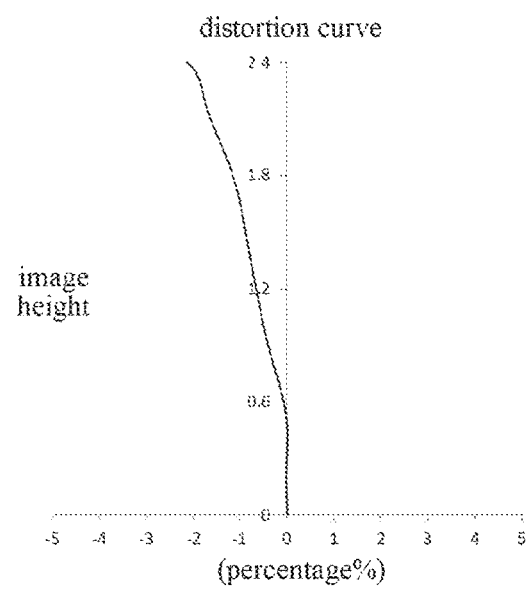
Figure 18D:
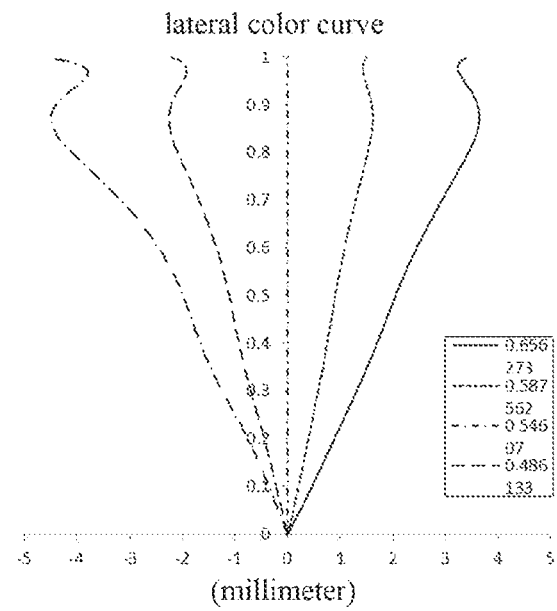
Figure 18E:
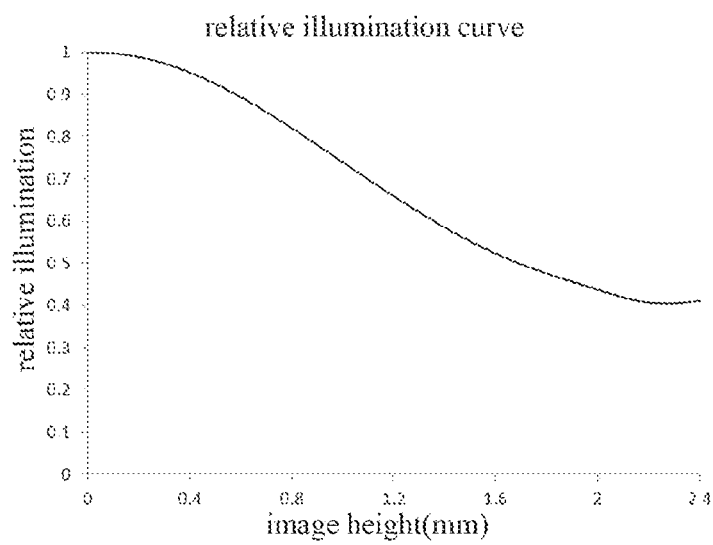

FIG. 18A shows a longitudinal aberration curve of the optical imaging system according to Embodiment 9, representing deviations of focal points of light of different wavelengths converged after passing through an optical system. FIG. 18B shows an astigmatic curve of the optical imaging system according to Embodiment 9, representing a curvature of a tangential image plane and a curvature of a sagittal image plane. FIG. 18C shows a distortion curve of the optical imaging system according to Embodiment 9, representing amounts of distortion at different viewing angles. FIG. 18D shows a lateral color curve of the optical imaging system according to Embodiment 9, representing deviations of different image heights on an image plane after light passes through the optical imaging system. FIG. 18E shows a relative illumination curve of the optical imaging system according to Embodiment 9, representing relative illumination corresponding to different image heights on the image plane. It can be seen from FIGS. 18A to 18E that the optical imaging system according to Embodiment 9 can achieve a good image quality.

To sum up, Embodiment 1 to Embodiment 9 respectively satisfy the relationships shown in Table 28 below.

TABLE 28

| Conditional Expression | Embodiment | | | | | | | | |
|---|---|---|---|---|---|---|---|---|---|
|  | 1 | 2 | 3 | 4 | 5 | 6 | 7 | 8 | 9 |
| \|V1 − V4\| | 3.16 | 3.16 | 0.00 | 0.00 | 3.16 | 3.16 | 3.16 | 3.16 | 3.16 |
| \|V1 − V2\| | 32.58 | 32.58 | 35.74 | 35.74 | 32.58 | 32.58 | 32.58 | 32.58 | 32.58 |
| ImgH/f | 1.07 | 1.14 | 1.14 | 1.14 | 1.14 | 1.13 | 1.13 | 1.16 | 1.14 |
| CT2/CT3 | 0.86 | 0.84 | 0.81 | 0.84 | 0.79 | 0.95 | 0.70 | 0.90 | 0.88 |
| R6/f3 | −0.35 | −0.36 | −0.56 | −0.55 | −0.57 | −0.43 | −0.33 | −0.72 | −0.35 |
| DT11/DT42 | 1.12 | 1.09 | 1.07 | 1.09 | 1.12 | 1.14 | 1.10 | 1.17 | 1.15 |
| DT12/ImgH | 0.83 | 0.81 | 0.83 | 0.86 | 0.87 | 0.88 | 0.79 | 0.85 | 0.86 |
| \|f3/f4\| | 0.75 | 0.82 | 0.78 | 0.79 | 0.71 | 0.61 | 1.08 | 0.64 | 0.78 |
| (T23 + T34)/T12 | 0.63 | 0.67 | 0.27 | 0.29 | 0.24 | 0.30 | 0.50 | 0.26 | 0.73 |
| CT1/TTL | 0.12 | 0.11 | 0.10 | 0.10 | 0.10 | 0.11 | 0.12 | 0.11 | 0.11 |

The present disclosure further provides an imaging device, having a photosensitive element that may be a photosensitive charge-coupled device (CCD) or complementary metal-oxide semiconductor (CMOS) element. The imaging device may be an independent camera device such as a digital camera, or may be an imaging module integrated in a mobile electronic device such as a mobile phone. The imaging device is equipped with the optical imaging system described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, such as technical solutions formed by replacing the features as disclosed in the present disclosure with (but not limited to) technical features with similar functions.

What is claimed is:

1. An optical imaging system, comprising sequentially, along an optical axis from an object side to an image side, a first lens, a second lens, a third lens and a fourth lens,
   wherein the first lens has a positive refractive power or a negative refractive power, an object-side surface of the first lens is a concave surface, and an image-side surface of the first lens is a convex surface;
   both the second lens and the third lens have positive refractive powers; and
   the fourth lens has a positive refractive power or a negative refractive power,
   wherein an abbe number V1 of the first lens and an abbe number V4 of the fourth lens satisfy: |V1−V4|≤30; and the abbe number V1 of the first lens and an abbe number V2 of the second lens satisfy: 20≤|V1−V2|≤50,
   wherein the optical imaging system further comprises an electronic photosensitive element disposed on an image plane of the optical imaging system, and
   half of a diagonal length ImgH of an effective pixel area of the electronic photosensitive element and a total effective focal length f of the optical imaging system satisfy: ImgH/f>1.

2. The optical imaging system according to claim 1, wherein an image-side surface of the third lens is a convex surface, and a radius of curvature R6 of the image-side surface of the third lens and an effective focal length f3 of the third lens satisfy: −0.8<R6/f3<−0.3.

3. The optical imaging system according to claim 1, wherein an effective focal length f3 of the third lens and an effective focal length f4 of the fourth lens satisfy: 0.5<|f3/f4|<1.2.

4. The optical imaging system according to claim 1, wherein a center thickness CT2 of the second lens on the optical axis and a center thickness CT3 of the third lens on the optical axis satisfy: 0.5<CT2/CT3<1.

5. The optical imaging system according to claim 1, wherein a center thickness CT1 of the first lens on the optical axis and a distance TTL from the object-side surface of the first lens to the image plane on the optical axis satisfy: 0.1<CT1/TTL<0.2.

6. The optical imaging system according to claim 1, wherein (T23+T34)/T12<0.85,
T12 is a spacing distance between the first lens and the second lens on the optical axis, T23 is a spacing distance between the second lens and the third lens on the optical axis, and T34 is a spacing distance between the third lens and the fourth lens on the optical axis.

7. The optical imaging system according to claim 1, wherein an effective radius DT12 of the image-side surface of the first lens and the half of the diagonal length ImgH of the effective pixel area of the electronic photosensitive element satisfy: 0.7<DT12/ImgH<1.

8. An optical imaging system, comprising sequentially, along an optical axis from an object side to an image side, a first lens, a second lens, a third lens and a fourth lens,
wherein the first lens has a positive refractive power or a negative refractive power, an object-side surface of the first lens is a concave surface, and an image-side surface of the first lens is a convex surface;
both the second lens and the third lens have positive refractive powers; and
the fourth lens has a positive refractive power or a negative refractive power, and each of an object-side surface and an image-side surface of the fourth lens has at least one inflection point,
wherein an effective radius DT11 of the object-side surface of the first lens and an effective radius DT42 of the image-side surface of the fourth lens satisfy: 1<DT11/DT42<1.4.

9. The optical imaging system according to claim 8, wherein an image-side surface of the third lens is a convex surface.

10. The optical imaging system according to claim 9, wherein an abbe number V1 of the first lens and an abbe number V4 of the fourth lens satisfy: |V1−V4|≤30.

11. The optical imaging system according to claim 10, wherein the abbe number V1 of the first lens and an abbe number V2 of the second lens satisfy: 20≤|V1−V2|≤50.

12. The optical imaging system according to claim 8, wherein the fourth lens has the negative refractive power.

13. The optical imaging system according to claim 12, wherein an effective focal length f3 of the third lens and an effective focal length f4 of the fourth lens satisfy: 0.5|f3/f4|<1.2.

14. The optical imaging system according to claim 8, wherein a center thickness CT2 of the second lens on the optical axis and a center thickness CT3 of the third lens on the optical axis satisfy: 0.5<CT2/CT3<1.

15. The optical imaging system according to claim 8, wherein (T23+T34)/T12<0.85,
T12 is a spacing distance between the first lens and the second lens on the optical axis, T23 is a spacing distance between the second lens and the third lens on the optical axis, and T34 is a spacing distance between the third lens and the fourth lens on the optical axis.

16. The optical imaging system according to claim 8, wherein the optical imaging system further comprises an electronic photosensitive element disposed on an image plane of the optical imaging system, and
an effective radius DT12 of the image-side surface of the first lens and half of a diagonal length ImgH of an effective pixel area of the electronic photosensitive element satisfy: 0.7<DT12/ImgH<1.

17. An optical imaging system, having a total effective focal length f, and comprising sequentially, along an optical axis from an object side to an image side, a first lens, a second lens, a third lens and a fourth lens,
wherein both the second lens and the third lens have positive refractive powers;
at least one of the first lens and the fourth lens has a negative refractive power; and
the optical imaging system further comprises an electronic photosensitive element disposed on an image plane of the optical imaging system, and half of a diagonal length ImgH of an effective pixel area of the electronic photosensitive element and the total effective focal length f satisfy: ImgH/f>1,
wherein an effective radius DT11 of an object-side surface of the first lens and an effective radius DT42 of an image-side surface of the fourth lens satisfy: 1<DT11/DT42<1.4.

18. The optical imaging system according to claim 17, wherein an image-side surface of the third lens is a convex surface.

19. The optical imaging system according to claim 18, wherein a radius of curvature R6 of the image-side surface of the third lens and an effective focal length f3 of the third lens satisfy: −0.8<R6/f3<−0.3.

20. The optical imaging system according to claim 17, wherein each of an object-side surface and an image-side surface of the fourth lens has at least one inflection point.

21. The optical imaging system according to claim 17, wherein the fourth lens has the negative refractive power.

* * * * *